United States Patent
Ohnishi et al.

(10) Patent No.: US 10,728,160 B2
(45) Date of Patent: Jul. 28, 2020

(54) COMMUNICATION CONTROLLER, COMMUNICATION CONTROL METHOD, AND COMMUNICATION CONTROL SYSTEM

(71) Applicant: Panasonic Intellectual Property Corporation of America, Torrance, CA (US)

(72) Inventors: Ryota Ohnishi, Hyogo (JP); Takahiro Yoneda, Osaka (JP); Eiichi Muramoto, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 242 days.

(21) Appl. No.: 15/649,693

(22) Filed: Jul. 14, 2017

(65) Prior Publication Data
US 2018/0034741 A1 Feb. 1, 2018

(30) Foreign Application Priority Data

Jul. 27, 2016 (JP) .................................. 2016-147156

(51) Int. Cl.
*H04L 12/825* (2013.01)
*H04L 29/06* (2006.01)
*H04L 12/725* (2013.01)

(52) U.S. Cl.
CPC .............. *H04L 47/25* (2013.01); *H04L 69/22* (2013.01); *H04L 69/24* (2013.01); *H04L 45/306* (2013.01)

(58) Field of Classification Search
CPC ........ H04L 45/306; H04L 47/25; H04L 69/22
See application file for complete search history.

(56) References Cited

U.S. PATENT DOCUMENTS

| | | | | |
|---|---|---|---|---|
| 8,762,477 B2* | 6/2014 | Xie | ........................ | H04L 67/327 709/213 |
| 8,762,570 B2* | 6/2014 | Qian | ..................... | H04L 67/327 709/241 |
| 9,553,790 B2* | 1/2017 | Kim | ........................ | H04L 45/00 |
| 9,769,231 B1* | 9/2017 | Cotter | ................... | H04L 65/602 |

(Continued)

FOREIGN PATENT DOCUMENTS

WO 2009/029204 3/2009

OTHER PUBLICATIONS

Alexander Afanasyev et al., "NFD Developer's Guide", NDN, Technical Report NDN-0021, Aug. 25, 2014. [retrieved on the Internet on Jul. 7, 2015; http://named-data.net/wp-content/uploads/2014/07/NFD-developer-guide.pdf].

*Primary Examiner* — Joe Chacko
(74) *Attorney, Agent, or Firm* — Greenblum & Bernstein, P.L.C.

(57) ABSTRACT

A router includes a content store (CS) that stores content, a packet processing determination unit that determines whether a received interest packet is a best available (BA) interest packet, and an optimum content request processor that if it is determined that the interest packet is a BA interest packet and if the optimum content request processor determines that content having higher quality than the quality of the content stored in the CS can be acquired from an upstream router, on the basis of the quality of the content stored in the CS and constraining conditions of the BA interest packet, forwards the BA interest packet to the upstream router.

11 Claims, 11 Drawing Sheets

(56) References Cited

U.S. PATENT DOCUMENTS

| | | | | |
|---|---|---|---|---|
| 9,781,047 B2* | 10/2017 | Muramoto | | H04L 47/29 |
| 2012/0155464 A1* | 6/2012 | Kim | | H04L 12/1859 |
| | | | | 370/390 |
| 2013/0166695 A1* | 6/2013 | Lee | | G06F 16/1834 |
| | | | | 709/219 |
| 2013/0297815 A1* | 11/2013 | Ma | | H04L 65/608 |
| | | | | 709/231 |
| 2015/0095481 A1* | 4/2015 | Ohnishi | | H04L 1/004 |
| | | | | 709/223 |
| 2015/0281083 A1* | 10/2015 | Kim | | H04L 45/7457 |
| | | | | 370/235 |
| 2015/0304380 A1* | 10/2015 | Muramoto | | H04N 21/2187 |
| | | | | 709/219 |

* cited by examiner

FIG. 2

PIT (200)

| name (201) | in face (202) | out face (203) |
|---|---|---|
| a | eth1 | eth0 |
| a | eth2 | eth0 |
| b | eth0 | |

FIG. 3

Manifest (300)

| name (301) | videoA |
|---|---|
| Available Rate (302) | 500 k |
| | 1 M |
| | 3 M |
| | 5 M |
| | 10 M |

FIG. 8

| 801 | 802 | 803 | 804 | 805 | 806 |
|---|---|---|---|---|---|
| name | in face | out face | BA req | condition recv. | condition sent |
| a | eth1 | eth0 | No | --- | --- |
| a | eth1 | eth0 | Yes | min 1 M  max 10 M | min 1 M  max 5 M |
| a | eth2 | eth0 | Yes | min 500 k  max 10 M | min 1 M  max 5 M |
| b | eth1 | eth0 | Yes | min 500 k  max 10 M | min 3 M  max 5 M |

PIT 800

US 10,728,160 B2

COMMUNICATION CONTROLLER, COMMUNICATION CONTROL METHOD, AND COMMUNICATION CONTROL SYSTEM

BACKGROUND

1. Technical Field

The present disclosure relates to a communication controller connected to a content-centric network and a communication control method performed thereby, and a communication control system using content-centric networking. In particular, the present disclosure relates to a technology that selects the quality with which content is delivered.

2. Description of the Related Art

Content-centric networking (CCN) has been proposed in recent years as a next-generation communication system that replaces the Internet protocol (IP)-based network communication system. For example, Alexander Afanasyev et al., "NFD Developer's Guide", [online], NDN, Technical Report NDN-0021, [retrieved on the Internet on Jul. 7, 2015; http://named-data.net/wp-content/uploads/2014/07/NFD-developer-guide.pdf] discloses a technology that delivers content through CCN.

The content-centric networking communication system is characterized in that when acquiring content, the content name itself rather than information indicating the position of the content, such as an IP address, is used as an identifier. Also, in typical CCN communication, a terminal device (client) transmits an interest packet about content and receives a data packet corresponding to the transmitted interest packet and containing the content from a content provider (publisher) on CCN.

Japanese Patent No. 5341089 discloses a method for, when delivering content through a typical network, delivering the content at an optimum bit rate in accordance with the bandwidth of the network. The bit rate is controlled by causing a proxy server on the network to receive a reception feedback message from a client and to forward the message to a media server.

SUMMARY

However, the delivery quality of content in content-centric networking needs to be further improved.

One non-limiting and exemplary embodiment provides a communication controller, communication control method, and communication control system that when delivering content using content-centric networking, are able to deliver the content with higher quality.

In one general aspect, the techniques disclosed here feature a communication controller connected to content-centric networking. The communication controller includes a data storage unit that stores content, a determination unit that determines whether a received interest packet is a constrained interest packet including a content name for identifying content and quality constraining information that defines an allowable quality range of the content, and a request processor that if the determination unit determines that the interest packet is the constrained interest packet and if the request processor determines that content having higher quality than quality of the content stored in the data storage unit can be acquired from a forward destination communication controller, on the basis of the quality of the content stored in the data storage unit and the quality constraining information, forwards the constrained interest packet to the forward destination communication controller and, if the determination unit determines that the interest packet is the constrained interest packet and if the request processor determines that the quality of the content stored in the data storage unit is equal to or higher than quality of content acquirable from the forward destination communication controller, on the basis of the quality of the content stored in the data storage unit and the quality constraining information, transmits a data packet containing the content stored in the data storage unit in response.

It should be noted that general or specific embodiments may be implemented as a system, a method, an integrated circuit, a computer program, a storage medium, or any selective combination thereof.

According to the present disclosure, when delivering content using content-centric networking, the content can be delivered with higher quality.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a diagram showing an example configuration of PIT information stored in the PIT of a typical CCN router;

FIG. 3 is a diagram showing an example configuration of a manifest file;

FIG. 8 is a diagram showing an example of the data structure of PIT information stored in a PIT shown in FIG. 7;

DETAILED DESCRIPTION

Underlying Knowledge Forming Basis of the Present Disclosure

Now, knowledge forming the basis of the present disclosure will be described.

Figure 1:
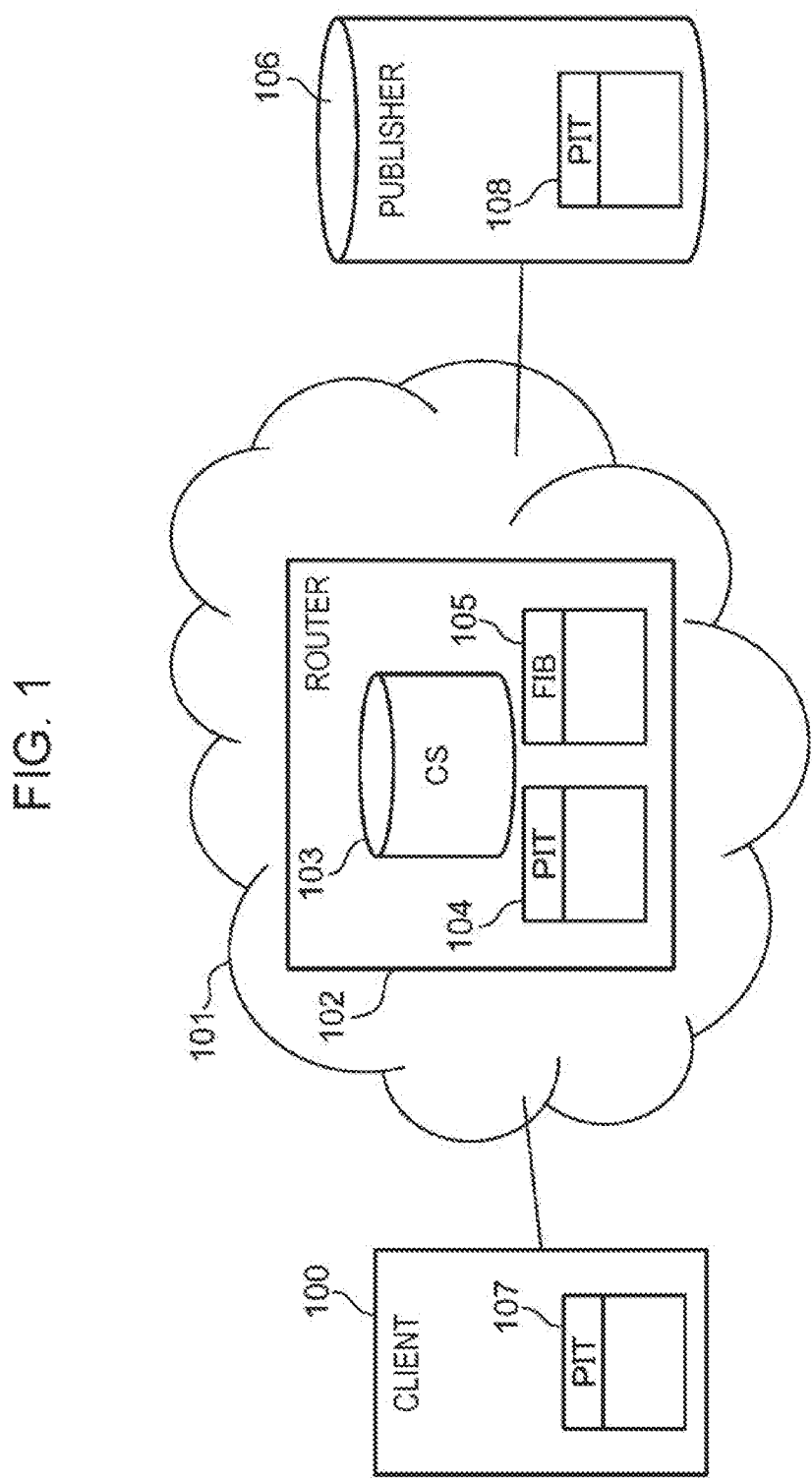
FIG. 1 is a diagram showing an example configuration of a communication control system using CCN networking.

FIG. 1 is a diagram showing an example configuration of a communication control system using a CCN network.

As shown in FIG. 1, a client 100 that acquires content is connected to a publisher 106 that provides content, through a CCN network 101. One or more routers 102 are connected to the CCN network 101. In the CCN network 101, data (a packet, etc.) is transmitted or forwarded and received through interfaces called faces. Note that only one router 102 is shown in FIG. 1 to simplify the illustration. The same applies to the client 100 and publisher 106.

The router 102 includes a content store (CS) 103, a pending interest table (PIT) 104, and a forwarding information base (FIB) 105.

The CS 103 is a data storage unit that stores content distributed through the CCN network 101. The PIT 104 is a request storage unit that stores information about received and forwarded interest packets. The FIB 105 is a path information storage unit that stores path information indicating paths through which interest packets are forwarded.

In the CCN network 101, content is communicated with the name thereof as an identifier while using the CSs 103 of the routers 102. Thus, if multiple clients 100 acquire the same content, the data can be delivered more efficiently. Similarly, the client 100 and publisher 106 include a PIT 107, PIT 108, respectively.

The configuration of the PIT of a typical CCN router, and a method for generating an entry into the PIT and a method for deleting the entry will be described. FIG. 2 shows an example configuration of PIT information stored in the PIT of a typical CCN router.

PIT information 200 about interest packets processed on the router 102 shown in FIG. 2 consists of entries in a "name" field 201 indicating the names of pieces of content requested by the interest packets, entries in an "in face" field 202 which are receiving-interface information indicating receiving faces that have received the interest packets, and entries in an "out face" field 203 which are transmitting-interface information indicating transmitting faces that have forwarded (transmitted) the interest packets. The entries are associated with each other among the fields. The PIT information 200 is stored in the PIT 104 of the router 102.

As an example, there will be described a case where the router 102 receives an interest packet having a name "a" from a receiving face "eth1" and forwards it from a transmitting face "eth0." In this case, as shown in the third row from below in FIG. 2, an entry "a" is made in the "name" field 201 of the PIT, an entry "eth1" in the "in face" field 202 thereof, and an entry "eth0" in the "out face" field 203 thereof.

If the router 102 receives the interest packet having the name "a" from a receiving face "eth2" and forwards it from the transmitting face "eth0," an entry "a" is made in the "name" field 201 of the PIT, an entry "eth2" in the "in face" field 202 thereof, and an entry "eth0" in the "out face" field 203 thereof, as shown in the second row from below in FIG. 2.

As another example, there will be described a case where the router 102 receives an interest packet having a name "b" from a receiving face "eth0" and is performing a process for forwarding it, within itself. In this case, the interest packet has yet to be transmitted. For this reason, as shown in the first row from below in FIG. 2, an entry "b" is made in the "name" field 201 of the PIT, an entry "eth0" in the "in face" field 202 thereof, and no entry (blank) in the "out face" field 203 thereof.

Since the router 102 receives and transmits interest packets as described above, the PIT 104 of the router 102 contains information about both the receiving faces and transmitting faces.

On the other hand, the client 100 only transmits interest packets. Accordingly, the PIT 107 of the client 100 contains only information about the transmitting faces. The publisher 106 only receives interest packets. Accordingly, the PIT 108 of the publisher 106 contains only information about the receiving faces. The "name" fields of the PITs 107, 108 contain information indicating the names of pieces of content requested by interest packets.

The entries in the PITs 104, 107, 108 thus generated are deleted when corresponding data packets are processed. That is, when the router 102 or client 100 receives a data packet corresponding to an interest packet, corresponding transmitting face information is deleted. Also, when the router 102 or publisher 106 transmits a data packet corresponding to an interest packet, corresponding all entries including receiving face information and name information are deleted.

As seen above, CCN controls the transmission and reception (forwarding) of data using the name of content requested by an interest packet, receiving face information, transmitting face information.

In CCN communication, content such as moving images can be delivered efficiently by effectively using the caches of the routers on the network. However, as with IP communication, CCN communication may be provided as best-effort service. To smoothly deliver content on such service, it is necessary to adapt the bit rate of the content to the varying band of the network.

For example, in IP communication, adaptive streaming as represented by MPEG-DASH is often used to deliver moving-image content. Adaptive streaming is a technology that realizes smooth delivery by causing the delivery source to encode the same content at multiple bit rates and then causing a client to select the content having a lower bit rate than that of the bottleneck link of the network.

Adaptive streaming can also be applied to the delivery of moving images through CCN. However, CCN is a receiver-driven communication system by which a client transmits an interest packet and acquires content through a network. For this reason, before requesting the content, the client must know the bit rate at which the content is delivered. Among methods for knowing the bit rate is the use of a file called manifest.

FIG. 3 is a diagram showing an example configuration of a manifest file. Here, assume that content having a name "videoA" is delivered at bit rates of "500 kbps," "1 Mbps," "3 Mbps," "5 Mbps," and "10 Mbps." While the unit is omitted in the description of the specification and drawings, the unit of bit rate is "bps" unless otherwise specified. Also, the term "bit rate" may be simply referred to as a rate.

A manifest file 300 shown in FIG. 3 consists of a "name" field 301 in which an entry indicating the name of content is made and an "Available Rate" field 302 in which the delivery bit rates of content are listed. The content name "videoA" is written in the "name" field 301. The delivery bit rates "500 k" to "10M" of the content are listed in the "Available Rate" field 302. There pieces of information are stored in the manifest file 300 as manifest information.

In the delivery of moving images through CCN, first, the client requests a manifest file about desired content and receives it. The client then selects a desired bit rate from bit rates described in the received manifest file. Thus, the client can acquire content having the desired bit rate. This manifest file is not only used by the client, but also held by routers on the CCN network so that the routers can use the manifest file when forwarding content.

Typically, a router used in conventional IP communication does not have a state about a forwarded packet or a cache about content. For this reason, to smoothly receive content, the client only has to estimate the "end-to-end (E2E)" bottleneck link between the content source server and client located at ends of the network and to receive the content at a bit rate equal to or lower than the band of the bottleneck link.

On the other hand, a CCN router cashes once delivered content in the CS thereof. Thus, if the client transmits an interest packet to request content, not only a publisher which is the source of the content, but also the CS of the router delivers a data packet containing the content.

Since the CS of the router can also deliver the content, the content may be delivered with higher quality than in conventional delivery, depending on the situation of the network. For example, assume that the network between the client and publisher is congested and thus the band of the E2E bottleneck link is very low. In this case, if the band of the path from the router having content cached in the CS thereof to the client is sufficiently high, the client can acquire the high-bit-rate content cached in the CS.

However, to efficiently deliver content on the architecture of receiver-driven CCN while effectively using the CS of the router as described above, the client must check the bit rates of the content contained in the CS of the router and transmit an interest packet to the content having an optimum bit rate.

Japanese Patent No. 5341089 described above discloses a method involving, by a client, transmitting content reception information to a proxy server and determining a delivery rate using information from the proxy server. However, to apply this method to a CCN network, information about the bottleneck link from the publisher and router to the client needs to be gathered into a proxy server on the network. This method enormously increases the amount of information forwarded and results in the concentration of traffic on the proxy server and therefore is not realistic.

Another conceivable method is a method involving, by a client rather than a proxy server, grasping all position information of content on a network and selecting an optimum rate. However, in the architecture of CCN, the client can acquire only a limited range of information about the internal state of the network. For this reason, it is not realistic for the client to grasp the state of the cache on the network or the state of the bottleneck link in detail and to determine an optimum rate.

In view of the foregoing, more efficient delivery of content through a CCN network requires a new system by which a client can receive content at an optimum rate with a simple procedure.

To solve the above problem, a communication controller of one aspect of the present disclosure is a communication controller connected to content-centric networking. The communication controller includes a data storage unit that stores content, a determination unit that determines whether a received interest packet is a constrained interest packet including a content name for identifying content and quality constraining information that defines an allowable quality range of the content, and a request processor that if the determination unit determines that the interest packet is the constrained interest packet and if the request processor determines that content having higher quality than quality of the content stored in the data storage unit can be acquired from a forward destination communication controller, on the basis of the quality of the content stored in the data storage unit and the quality constraining information, forwards the constrained interest packet to the forward destination communication controller and, if the determination unit determines that the interest packet is the constrained interest packet and if the request processor determines that the quality of the content stored in the data storage unit is equal to or higher than quality of content acquirable from the forward destination communication controller, on the basis of the quality of the content stored in the data storage unit and the quality constraining information, transmits a data packet containing the content stored in the data storage unit in response.

According to this configuration, a comparison is made between the quality of the content stored in the data storage unit and the allowable quality range defined by the quality constraining information, and if it is determined that content having higher quality than the quality of the content stored in the data storage unit can be acquired from the forward destination communication controller, the constrained interest packet is forwarded to the forward destination communication controller. Thus, the content having the higher quality can be acquired from the forward destination communication controller. Also, a comparison is made between the quality of the content stored in the data storage unit and the allowable quality range defined by the quality constraining information, and if it is determined that the quality of the content stored in the data storage unit is equal to or higher than the quality of content acquirable from the forward destination communication controller, a data packet containing the content stored in the data storage unit is transmitted in response. Thus, content having the acquirable highest quality can be transmitted in the form of a data packet in response without forwarding an unnecessary constrained interest packet. As a result, when delivering content using content-centric networking, the content can be delivered with higher quality.

The quality constraining information may include bit rate constraining information indicating an allowable bit rate range of the content. The communication controller may further include a bandwidth information manager that acquires a communication bandwidth between the communication controller and the forward destination communication controller. If the request processor determines that content having higher quality than the quality of the content stored in the data storage unit can be acquired from the forward destination communication controller, on the basis of a bit rate of the content stored in the data storage unit, the bit rate constraining information, and the communication bandwidth, the request processor may forward the constrained interest packet to the forward destination communication controller. If the request processor determines that the bit rate of the content stored in the data storage unit is equal to or higher than a bit rate of content acquirable from the forward destination communication controller, on the basis of the bit rate of the content stored in the data storage unit, the bit rate constraining information, and the communication bandwidth, the request processor may transmit a data packet containing the content stored in the data storage unit in response.

According to this configuration, a comparison is made among the bit rate of the content stored in the data storage unit, the allowable bit rate range defined in the bit rate constraining information, and the available communication bandwidth between the communication controller and forward destination communication controller. If it is determined that content having higher quality than the quality of the content stored in the data storage unit can be acquired from the forward destination communication controller, the constrained interest packet is forwarded to the forward destination communication controller. If it is determined that the bit rate of the content stored in the data storage unit is equal to or higher than the bit rate of content acquirable from the forward destination communication controller, a data packet containing the content stored in the data storage unit is transmitted in response. Thus, by processing a packet using information about the communication bandwidth of content-centric networking and information about content cached in the communication controller, it is possible to deliver content having the highest quality acquirable by the terminal device and to improve the delivery quality of content.

The data packet may include the bit rate constraining information. When the request processor receives the data packet, the request processor may extract the bit rate constraining information from the data packet. If the request processor determines that the bit rate of the content stored in the data storage unit falls within an allowable bit rate range defined in the bit rate constraining information and is higher than a bit rate of the data packet, the request processor may transmit a data packet containing content having the highest bit rate among pieces of content stored in the data storage unit in response.

According to this configuration, it is possible to transmit content having the highest bit rate among pieces of content having higher bit rates than the bit rate of the received data packet in response.

If the request processor determines that a bit rate of content acquirable from a transmission source communication controller that has transmitted the constrained interest packet is higher than the bit rate of the content acquirable from the forward destination communication controller and the bit rate of the content stored in the data storage unit or determines that the bit rate of the content acquirable from the forward destination communication controller or the bit rate of the content stored in the data storage unit does not fall within the allowable bit rate range defined in the bit rate constraining information, on the basis of the bit rate of the content stored in the data storage unit, the bit rate constraining information, and the communication bandwidth, the request processor may transmit a negative acknowledgement packet indicating that content cannot be acquired in response.

According to this configuration, it is possible to transmit information indicating that content cannot be acquired, without forwarding an unnecessary constrained interest packet.

The negative acknowledgement packet may include the bit rate constraining information. When the request processor receives the negative acknowledgement packet, the request processor may extract the bit rate constraining information from the negative acknowledgement packet. If the request processor determines that the bit rate of the content stored in the data storage unit falls within the allowable bit rate range defined in the bit rate constraining information, the request processor may transmit a data packet containing content having the highest bit rate among pieces of content stored in the data storage unit in response.

According to this configuration, even if a negative acknowledgement packet indicating that content cannot be acquired is received, it is possible to transmit content having the highest bit rate among pieces of content falling within the allowable bit rate range in response.

The bit rate constraining information may include reception-time constraining information at reception of the constrained interest packet and transmission-time constraining information at transmission of the constrained interest packet. The request processor may generate the transmission-time constraining information on the basis of the bit rate of the content stored in the data storage unit, the reception-time constraining information, and the communication bandwidth.

According to this configuration, when transmitting a constrained interest packet, transmission-time constraining information can be generated in accordance with the communication bandwidth of content-centric networking and content cached in the communication controller. Thus, an upstream communication controller can receive, as reception-time constraining information, transmission-time constraining information updated to adapt to the communication bandwidth of content-centric networking and the state of content cached in the communication controller and can properly perform one of a process of forwarding the constrained interest packet to a forward destination communication controller, a process of transmitting a data packet containing the content stored in the data storage unit, and a process of transmitting a negative acknowledgement packet indicating that content cannot be acquired, using the received reception-time constraining information.

The communication controller may further include a bit rate storage unit that stores bit rate information transmitted from a content provider and includes the content name and a bit rate at which the content identified by the content name can be acquired. The request processor may determine which of a process of forwarding the constrained interest packet to the forward destination communication controller, a process of transmitting a data packet containing the content stored in the data storage unit in response, and a process of transmitting a negative acknowledgement packet indicating that content cannot be acquired in response should be performed, on the basis of the bit rate of the content stored in the data storage unit, the bit rate constraining information, the communication bandwidth, and the bit rate information.

According to this configuration, it is determined which of the process of forwarding the constrained interest packet, the process of transmitting a data packet containing the stored content in response, and the process of transmitting a negative acknowledgement packet indicating that content cannot be acquired in response should be performed, on the basis of the bit rate of the stored content, the bit rate constraining information, and the communication bandwidth in the acquirable bit rate range defined in the bit rate information. Thus, it is possible to reliably deliver content having the highest bit rate among pieces of acquirable content without forwarding an unnecessary constrained interest packet.

The request processor may set predetermined content in the data storage unit to an undeletable state when transmitting the constrained interest packet and may keep the predetermined content undeletable until receiving a packet corresponding to the constrained interest packet.

According to this configuration, it is possible to prevent a situation in which content that must be cached in the data storage unit is deleted and thus can no longer be delivered.

At least one of a header region and a message region of the interest packet may contain identification information indicating that the interest packet is the constrained interest packet.

According to this communication, the constrained interest packet can be distinguished from a normal interest packet using identification information indicating that the interest packet is a constrained interest packet. A normal interest packet can be subjected to conventional interest packet processing. A constrained interest packet can properly be subjected to the above constrained interest packet processing.

A communication control method of another aspect of the present disclosure is a communication control method performed by a communication controller, the communication controller being connected to content-centric networking and including a data storage unit that stores content. The method includes determining whether a received interest packet is a constrained interest packet including a content name for identifying content and quality constraining information that defines an allowable quality range of the content, if it is determined that the interest packet is the constrained interest packet and if it is determined that content having higher quality than quality of the content stored in the data storage unit can be acquired from a forward destination communication controller, on the basis of quality of the content stored in the data storage unit and the quality constraining information, forwarding the constrained interest packet to the forward destination communication controller, and if it is determined that the interest packet is the constrained interest packet and if it is determined that the quality of the content stored in the data storage unit is equal to or higher than quality of content acquirable from the forward destination communication controller, on the basis of the quality of the content stored in the data storage unit and the quality constraining information, transmitting a data packet containing the content stored in the data storage unit in response.

According to this configuration, effects similar to those of the communication controller can be obtained.

A communication control system of yet another aspect of the present disclosure is a communication control system that delivers content through content-centric networking. The communication control system includes a content provider that provides the content, a terminal device that acquires the content, and a relay device connected to the content provider and the terminal device through the content-centric networking. The relay device includes a data storage unit that stores the content, a determination unit that determines whether a received interest packet is a constrained interest packet including a content name for identifying content and quality constraining information that defines an allowable quality range of the content, and a request processor that if the determination unit determines that the interest packet is the constrained interest packet and if the request processor determines that content having higher quality than quality of the content stored in the data storage unit can be acquired from a forward destination communication controller, on the basis of the quality of the content stored in the data storage unit and the quality constraining information, forwards the constrained interest packet to the forward destination communication controller and, if the determination unit determines that the interest packet is the constrained interest packet and if the request processor determines that the quality of the content stored in the data storage unit is equal to or higher than quality of content acquirable from the forward destination communication controller, on the basis of the quality of the content stored in the data storage unit and the quality constraining information, transmits a data packet containing the content stored in the data storage unit in response.

According to this configuration, the relay device makes a comparison between the quality of the content stored in the data storage unit and the allowable quality range defined by the quality constraining information, and if it determines that content having higher quality than the quality of the content stored in the data storage unit can be acquired from the forward destination communication controller, the relay device forwards the constrained interest packet to the forward destination communication controller. Thus, the relay device is able to acquire content having higher quality from the forward destination communication controller. Also, the relay device makes a comparison between the quality of the content stored in the data storage unit and the allowable quality range defined by the quality constraining information, and if it determines that the quality of the content stored in the data storage unit is equal to or higher than the quality of content acquirable from the forward destination communication controller, the relay device transmits a data packet containing the content stored in the data storage unit in response. Thus, the relay device is able to transmit content having the highest quality acquirable by the terminal device in the form of a data packet in response, without forwarding an unnecessary constrained interest packet. As a result, when delivering content to a terminal device using content-centric networking, the content can be delivered with higher quality.

Now, a method for performing adaptive streaming more properly in CCN according to the present disclosure will be described.

Embodiment

Figure 4:
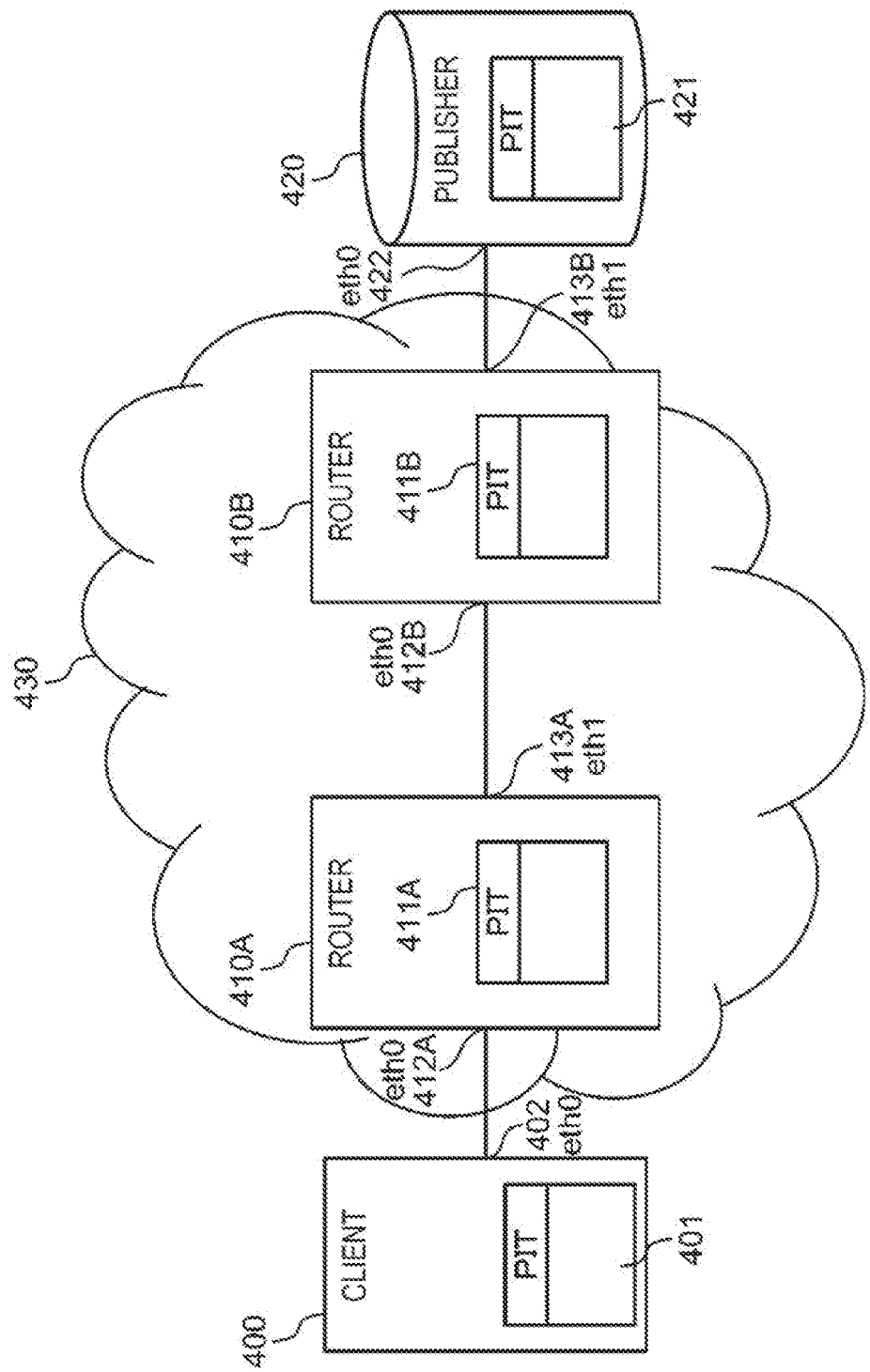
FIG. 4 is a diagram showing an example configuration of a communication control system according to a first embodiment of the present disclosure.

FIG. 4 is a diagram showing an example configuration of a communication control system according to one embodiment of the present disclosure. The communication control system shown in FIG. 4 includes a client 400 that requests content, multiple routers 410A, 410B, and a publisher 420 that provides content. The client 400 is connected to the publisher 420 through a CCN network 430. The routers 410A, 410B are connected to the CCN network 430. The client 400 is connected to the publisher 420 through the routers 410A, 410B. The client 400 acquires the content from the router 410A or 410B or publisher 420.

The client 400 is an example of a terminal device; the routers 410A, 410B are an example of a relay device; the publisher 420 is an example of a content provider; and the client 400, routers 410A, 410B, and publisher 420 are an example of a communication controller.

While FIG. 4 shows the one client 400, the two routers 410A, 410B, and the one publisher 420, the numbers of clients, routers, and publishers are not limited to those in this example. Two or more clients, one or three or more routers, and two or more publishers may be used.

The client 400 includes a pending interest table (PIT) 401; the routers 410A, 410E include PITs 411A, 411B, respectively; and the publisher 420 includes a PIT 421. The PIT 401 is a request storage unit that stores information about transmitted interest packets. The PITs 411A, 411B are request storage units that store information about received and forwarded interest packets. The PIT 421 is a request storage unit that stores information about received interest packets.

The client 400 includes an interface 402 serving as a transmitting face "eth0." The router 410A includes an interface 412A serving as a receiving face "eth0" and an interface 413A serving as a transmitting face "eth1." The router 410B includes an interface 412B serving as a receiving face "eth0" and an interface 413B serving as a transmitting face "eth1." The publisher 420 includes an interface 422 serving as a receiving face "eth0." A BA interest packet (to be discussed later) or the like is forwarded through the receiving and transmitting faces.

In the above communication control system, the client 400 on the CCN network 430 transmits an interest packet requesting the delivery of content having an optimum bit rate (a best available interest packet; hereafter referred to as "BA interest packet") to the CCN network 430. The client 400 can add, to the BA interest packet, desired maximum and minimum reception bit rates specified from multiple bit rates of the content described in the manifest file of the content, as constraining conditions.

The BA interest packet is an example of a constrained interest packet including a content name for identifying content and quality constraining information that defines the allowable quality range of the content. The constraining conditions are examples of quality constraining information that defines the allowable quality range of content. While, in the present embodiment, the bit rate of content is described as an example of the quality of the content, quality of types different from the bit rate may be used.

The routers 410A, 410B receive the BA interest packet and make a comparison between the constraining conditions written in the BA interest packet and the communication bandwidth between content in the CS (e.g., a CS 704 in FIG. 7 to be discussed later) thereof and an upstream router. The routers 410A, 410B determine whether they should transmit the content from the CS thereof in response, or forward the BA interest packet to the upstream device, or transmit a negative-acknowledgement (NACK) packet indicating that the content cannot be reached in response.

As used herein, the term "upstream device" refers to a device located in the direction in which one device on the network forwards the interest packet. For example, the router 410B and publisher 420 are upstream devices of the router 410A. The term "downstream device" refers to a device located in the direction in which a data packet is forwarded. For example, the router 410A and client 400 are downstream devices of the router 410B. The NACK packet is an example of a negative acknowledgement packet indicating that the content cannot be acquired.

When it receives the BA interest packet, the publisher 420 determines whether it should transmit content in the CS thereof in response on the constraining conditions written in the BA interest packet or transmit a NACK packet in response.

Specifically, when the routers 410A, 410B on the CCN network 430 receives the BA interest packet, they make a comparison among the constraining conditions of the BA interest packet, the bit rate of content in the CS thereof, and the communication bandwidth of the link between the upstream device and themselves and then determine which of content in the CS of a downstream router, content having a higher bit rate that may be present in the upstream router or publisher, and content in the CS thereof is content having the highest bit rate acquirable by the client or determine that there is no content having a bit rate acquirable by the client 400.

If the routers 410A, 410B determine that the content in the CS of the downstream router is optimum content that can be received by the client 400 or if they determine that there is no content having a bit rate acquirable by the client 400, they transmit a NACK packet in response. That is, in these cases, the routers that have received the BA interest packet do not forward a data packet.

On the other hand, if they determine that they are more likely to acquire content having a higher bit rate that may be present in the upstream router or publisher 420, the routers 410A, 410B attempt to acquire content having a higher bit rate by forwarding the BA interest packet to the upstream router or publisher 420.

If they determine that the content in the CS thereof is content having the highest rate acquirable by the client, the routers 410A, 410B transmit the content in response.

If they receive a data packet, the routers 410A, 410B select optimum content between content in the CS thereof and content contained in the received data packet in accordance with constraining conditions written in a BA interest packet corresponding to the data packet and transmit a data packet containing the optimum content.

If they receive a NACK packet, the routers 410A, 410B determine whether content in the CS thereof can be transmitted, in accordance with constraining conditions written in a BA interest packet corresponding to the received NACK packet. If so, they transmit a data packet containing the content; if not so, they forward the NACK packet.

In the above BA interest packet forwarding process, the routers 410A, 410E indicate that the BA interest packet is a packet related to a request for content having an optimum bit rate (best available request; hereafter referred to as "BA request"), using a type or field in the BA interest packet, as well as rewrite the constraining conditions described in the BA interest packet in accordance with the situation of the cache in the CS thereof or the bandwidth of the link between the router and the upstream device. The constraining conditions are rewritten each time the routers 410A, 410B forward a BA interest packet, and the routers 410A, 410B use the constraining conditions to determine optimum content.

Figure 5:
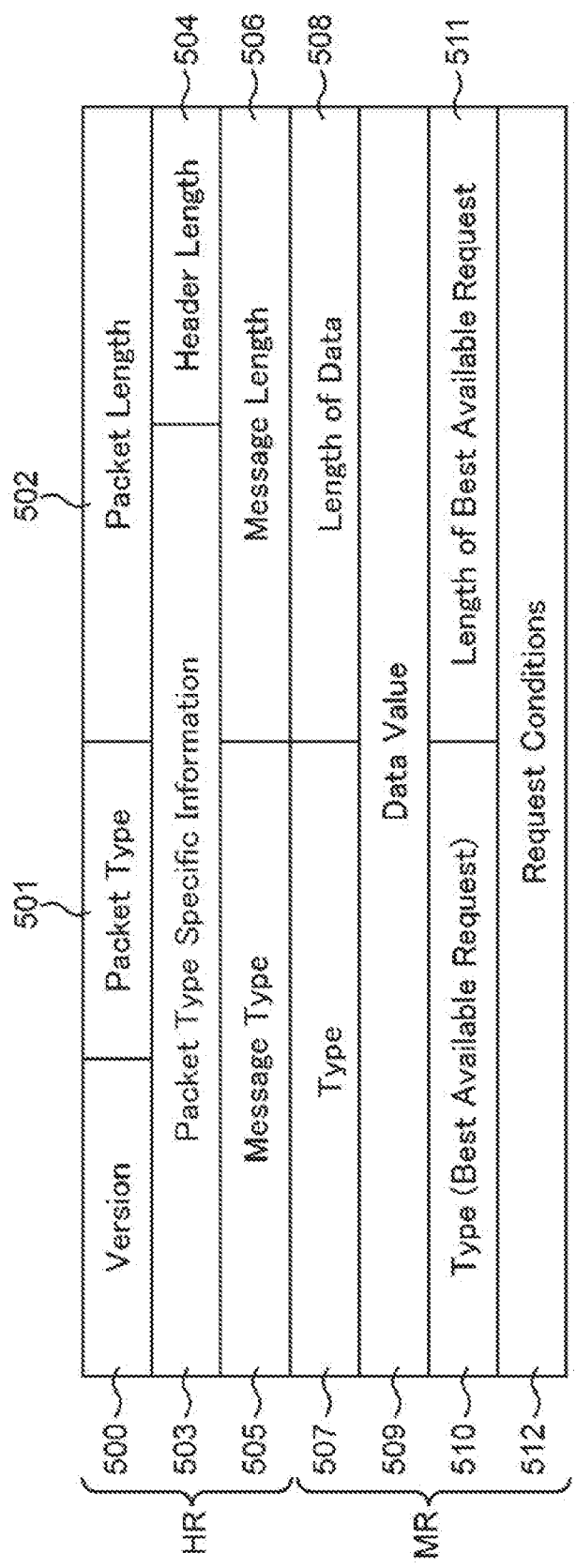
FIG. 5 is a diagram showing an example of the format of a packet used in the communication control system shown in FIG. 4.

FIG. 5 is a diagram showing an example of the format of a packet used in the communication control system shown in FIG. 4. The packet shown in FIG. 5 includes a header region HR and a message region MR. The header region HR is a region common to CCN packets. The header region HR includes a packet version field 500, a packet type field 501, a packet length field 502, a packet type specific information field 503, a header length field 504, a message type field 505, and a message length field 506. Each field stores information.

If the packet is a data packet, the message region MR thereof stores two types of information: data about content per se 507 to 509; and BA request-related information 510 to 512.

If the packet type field 501 indicates an identifier identifying a data packet, the type field 507 indicates an identifier indicating data; the data length field 508 indicates the length of data stored in the data value field 509; and the data is stored in the data value field 509.

The type field 510 indicates an identifier identifying information related to a BA request. The BA request data length field 511 indicates the length of information stored in the request condition 512. PIT information is stored in the request condition field 512.

If the packet is a BA interest packet, at least one of the header region HR and message region MR of the packet preferably includes identification information indicating that the packet is a BA interest packet. For example, the packet type field 501 indicates a number allocated to the BA interest packet, or the packet type field 501 indicates a number indicating a normal interest packet and the type field 510 of the message region MR indicates a message indicating that the packet is a BA request; the data length field 511 indicates the length of the message; and the request condition field 512 indicates constraining conditions. Thus, the routers 410A, 410B can determine that the packet is a BA interest packet.

The same applies to the case where the packet is a NACK packet. That is, the packet type field 501 indicates that the packet is a packet related to a BA request, and the type field 510 to the request condition field 512 of the message region MR indicate information related to the BA request. Thus, the packet type can be clearly indicated.

To manage a state related to the transmission and reception of a BA interest packet, the routers 410A, 410B typically use the PIT in an expanded manner. Specifically, the routers 410A, 410B write three attributes, "whether each entry is related to a BA interest packet," "constraining conditions at reception," and "constraining conditions at transmission," to the PIT and, when receiving and transmitting a BA interest packet, write the three attributes to the BA interest packet.

As seen above, the client 400 can receive content having an optimum bit rate among pieces of content in the network, including cached data, by simply transmitting a BA interest packet to make a BA request, to the network.

Next, a case in which the client 400 acquires content "videoA" described in the manifest file shown in FIG. 3 at an optimum bit rate using a BA interest packet in the communication control system shown in FIG. 4 will be described with reference to FIG. 6.

Figure 6:
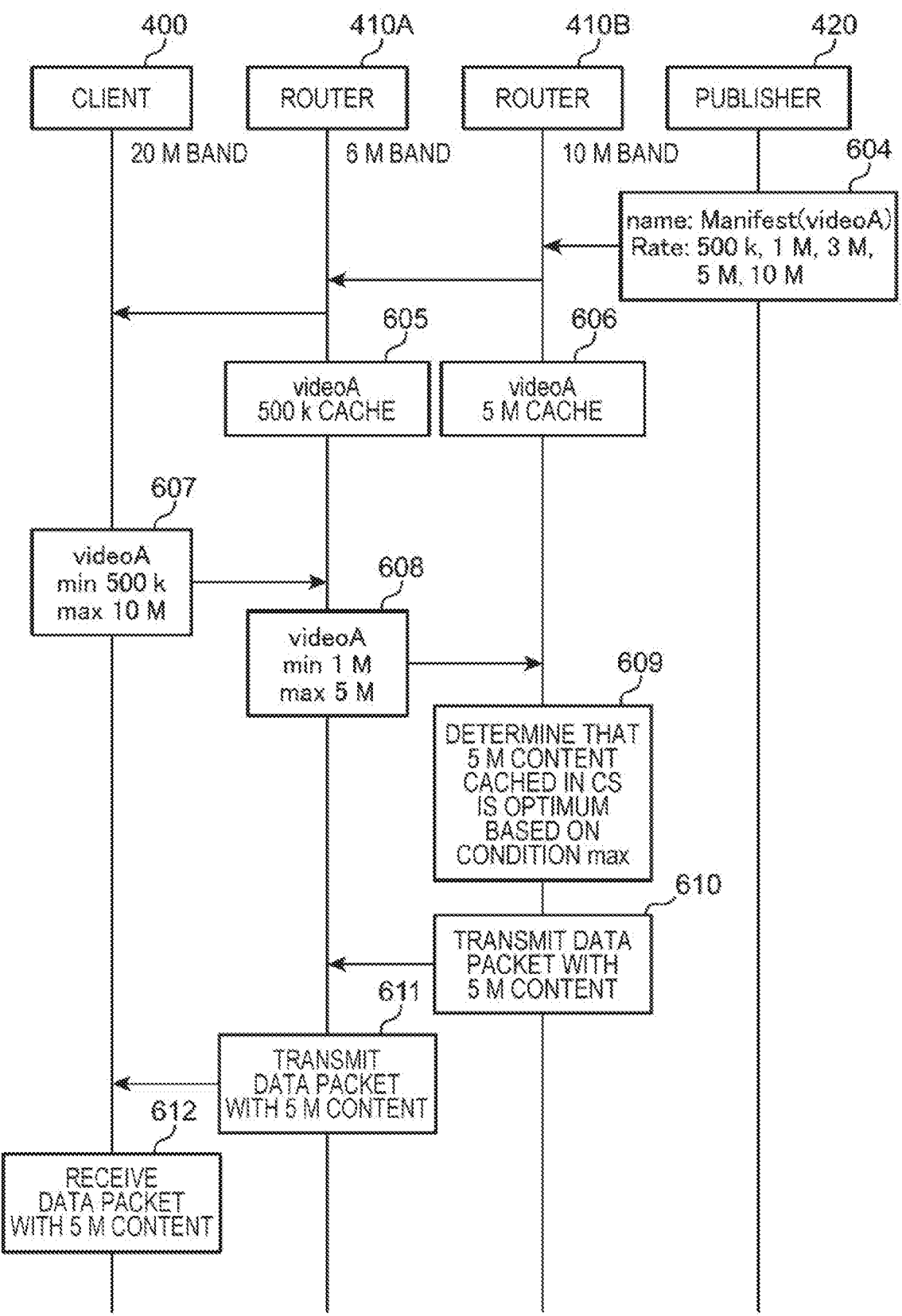
FIG. 6 is a sequence diagram showing an example of a process of delivering content having an optimum bit rate in the communication control system shown in FIG. 4.

FIG. 6 is a sequence diagram showing an example of a process of delivering content having an optimum bit rate in the communication control system shown in FIG. 4. The client 400 is connected to the publisher 420 through the routers 410A, 410B.

As a precondition, it is assumed that a manifest 604 about the content "videoA" acquired by the client 400 is previously delivered by the publisher 420 and each device stores the manifest file 604. It is also assumed that the communication bandwidth between the client 400 and router 410A at the acquisition of the content is 20M, the communication bandwidth between the router 410A and router 410B is 6M, and the communication bandwidth between the router 410B and publisher 420 is 10M. It is also assumed that the CS of the router 410A stores a cache 605 of the content "videoA" having a bit rate 500 k and the CS of the router 410B stores a cache 606 of the content "videoA" having a bit rate 5M.

First, in process 607, the client 400 transmits a BA interest packet requesting "videoA." Hereafter, the minimum bit rate added to a BA interest packet as a constraining condition will be referred to as min, and the maximum bit rate as max. The client 400 is not holding the content "videoA" having any bit rate. For this reason, the condition min (minimum bit rate) is set to 500 k, which is the minimum bit rate written in the manifest file 604. Similarly, the condition max (maximum bit rate) is set to 10M, which is the highest bit rate written in the manifest file 604, since the bandwidth of the link between the client 400 and the upstream router 410A is 20M.

Then, in process 608, the router 410A, which has received the BA interest packet, checks the situation of the CS thereof and the communication bandwidth between the upstream router 410B and itself. As a result, since the router 410A is holding content "videoA" having a bit rate 500 k in the CS thereof, the router 410A changes the condition min at the forward of the BA interest packet to 1M, which is one step higher rate than 500 k among the rates described in the manifest file 604. Also, since the communication bandwidth between the router 410A and the upstream router 410B is 6M, the router 410A changes the condition max to 5M, which is described in the manifest file 604 and is the highest of the lower bit rates than 6M. The router 410A then forwards the BA interest packet having a condition min of 1M and a condition max of 5M as constraining conditions.

Then, in process 609, the router 410B, which has received the BA interest packet, performs a determination process similar to process 608. Since it is holding the cache of content having 5M, which is the condition max of the received BA interest packet, in the CS thereof, the router 4108 determines that it is most appropriate to transmit this content in response.

Then, in process 610, the router 410B does not forward the BA interest packet but rather transmits a data packet containing content "videoA" held in itself in response.

Then, in process 611, the router 410A, which has received the data packet, forwards the data packet to the client 400, since it does not have content "videoA" having a higher bit rate than the received data packet.

Lastly, in process 612, the client 400 receives the content "videoA" having 5M, which is content having the highest rate that the client 400 can receive in the situation of the network.

As seen above, in the present communication control system, content having an optimum bit rate can be easily delivered to the client 400 in accordance with the situation of the network or the situation of the cache of the content. Thus, the delivery quality of content can be improved.

While, in the present embodiment, CCN is described as an example, the present disclosure may be applied to networking architectures of types other than CCN, for example, named data networking (NDN).

While, in the present embodiment, the routers in CCN are described in detail as an example, the communication controller of the present disclosure may be a client in CCN. In this case, the client issues a BA interest packet and receives content having an optimum bit rate. The communication controller of the present disclosure may also be a publisher in CCN. In this case, the communication controller receives a BA interest packet and transmits a data packet containing content having an optimum bit rate in response to the received BA interest packet.

Figure 7:
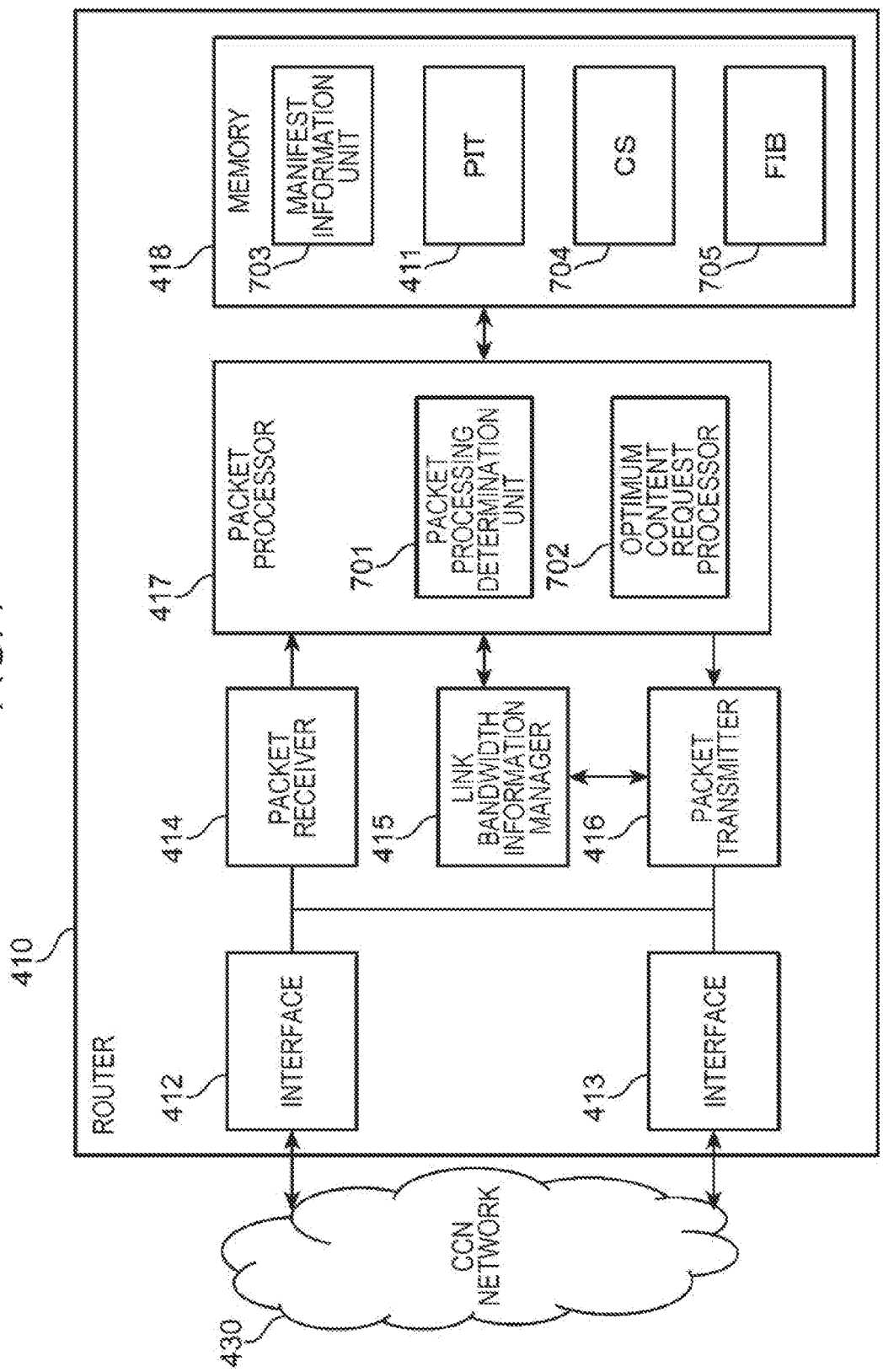
FIG. 7 is a block diagram showing an example configuration of a router shown in FIG. 4.

Next, the routers 410A, 410B shown in FIG. 4 will be described in more detail. FIG. 7 is a block diagram showing an example configuration of the routers 410A, 410B shown in FIG. 4. The router 410A and router 410B have similar configurations. For this reason, in the following description, the routers 410A, 410B will be referred to as the router 410, the PITs 411A, 411B as the PIT 411, the interfaces 412A, 412B as the interface 412, and the interfaces 413A, 413B as the interface 413.

The router 410 shown in FIG. 7 includes the interfaces 412, 413, a packet receiver 414, a link bandwidth information manager 415, a packet transmitter 416, a packet processor 417, and a memory 418.

The router 410 is connected to the CCN network 430 through the interfaces 412, 413 and transmits and receives interest packets, BA interest packets, data packets, and NACK packets. Note that packets that the router 410 transmits and receives to and from the CCN network 430 are not limited to the four types. For example, the router 410 may transmit and receive packets for exchanging routing information.

The interfaces 412, 413 are interfaces for communicating with other devices and serve as receiving interfaces for receiving a BA interest packet or the like or transmitting interfaces for transmitting a BA interest packet or the like. Thus, the path between the router 410 and a device connected thereto can be identified by identifying the interfaces 412, 413 on the basis of "in face," which is receiving interface information indicating the receiving face, and "out face," which is transmitting-interface information indicating the transmitting face.

The configuration of the interfaces 412, 413 is not limited to the above example and can be changed in various ways. For example, one or three or more interfaces may be used, or a single interface may be used logically as multiple interfaces.

The packet receiver 414 receives a BA interest packet or the like through the interface 412 or interface 413. The packet transmitter 416 transmits a BA interest packet or the like through the interface 412 or interface 413.

The packet receiver 414 and packet transmitter 416 are connected to the packet processor 417 that determines a method for processing a packet in the router 410. The packet transmitter 416 and packet processor 417 are connected to the link bandwidth information manager 415 that observes the bandwidth of the link between the router 410 and an upstream router and manages information about the bandwidth. The link bandwidth information manager 415 is not limited to this example and may be connected to the packet receiver 414 so that it observes the bandwidth of the link between the router 410 and a downstream router.

The packet processor 417 is connected to the memory 418 in the router 410. The memory 418 includes a manifest information unit 703, a PIT 411, a CS 704, and a FIB 705.

The manifest information unit 703 stores received manifest information (manifest file). The manifest information is an example of bit rate information that is transmitted from the publisher 420, which provides content, and includes a content name and bit rates at which content identified by the content name can be acquired.

The PIT 411 is a request storage unit that stores information about received and forwarded BA interest packets or the like. The CS 704 is a data storage unit that stores content delivered through the CCN network 430. FIB 705 is a path information storage unit that stores path information indicating paths through which BA interest packets or the like are forwarded. The FIB 705 is used when forwarding a packet.

The packet processor 417 includes a packet processing determination unit 701 and an optimum content request processor 702. The packet processing determination unit 701 determines whether a received packet is a BA request-related packet or another type of packet and determines a process corresponding to the determination result. If the received packet is a BA request-related packet, the optimum content request processor 702 makes a comparison among the bandwidth of the link between the router 410 and upstream router, content in the CS 704 of the router 410, and the received constraining conditions and determines packet processing corresponding to the comparison result.

The packet processing determination unit 701 also determines whether the received interest packet is a BA interest packet containing a content name for identifying content and constraining conditions indicating the allowable bit rate range of the content.

If the optimum content request processor 702 determines that content having a higher bit rate than the bit rate of the content stored in the CS 704 can be acquired from the upstream router, on the basis of the bit rate of the content stored in the CS 704, the constraining conditions indicating the allowable bit rate range of the content, and the communication bandwidth between the router 410 and the upstream router, it forwards the BA interest packet to the upstream router using the packet transmitter 416 or the like. On the other hand, if it determines that the bit rate of the content stored in the CS 704 is equal to or higher than the bit rate of content acquirable from the upstream router, the optimum content request processor 702 transmits a data packet containing the content stored in the CS 704 in response using the packet transmitter 416 or the like.

If it receives a data packet, the optimum content request processor 702 extracts, from the data packet, constraining conditions indicating the allowable bit rate range of content contained in the data packet. If it determines that the bit rate of the content stored in the CS 704 falls within the allowable range of the bit rate defined in the constraining conditions and is higher than the bit rate of the data packet, the optimum content request processor 702 transmits a data packet containing content having the highest bit rate among pieces of content stored in the CS 704 in response using the packet transmitter 416 or the like.

If the optimum content request processor 702 determines that the bit rate of content acquirable from the downstream router that has transmitted the BA interest packet is higher than the bit rate of the content acquirable from the upstream router and the bit rate of the content stored in the CS 704 or determines that the bit rate of the content acquirable from the upstream router or the bit rate of the content stored in the CS 704 do not fall within the allowable bit rate range defined in the constraining conditions, on the basis of the bit rate of the content stored in the CS 704, the constraining conditions indicating the allowable bit rate range of the content, and the communication bandwidth between the router 410 and upstream router, it transmits a NACK packet indicating that content cannot be acquired in response using the packet transmitter 416 or the like.

If it receives a NACK packet, the optimum content request processor 702 extracts constraining conditions indicating the allowable bit rate range of content from the NACK packet. If it determines that the bit rate of the content stored in the CS 704 falls within the allowable bit rate range defined in the constraining conditions, the optimum content request processor 702 transmits a data packet containing content having the highest bit rate among pieces of content stored in the CS 704 in response using the packet transmitter 416 or the like.

The optimum content request processor 702 also determines which of a process of forwarding the BA interest packet to the forward destination router, a process of transmitting a data packet containing the content stored in the CS 704 in response, and a process of transmitting a NACK packet indicating that content cannot be acquired in response should be performed, on the basis of the bit rate of the content stored in the CS 704, the constraining conditions indicating the allowable bit rate range of the content, the communication bandwidth between the router 410 and the upstream router, and the manifest information stored in the manifest information unit 703.

If the packet processing determination unit 701 determines that the interest packet is a BA interest packet and if the optimum content request processor 702 determines that content having a higher bit rate than the bit rate of the content stored in the CS 704 can be acquired from the upstream router, on the basis of the constraining conditions indicating the allowable bit rate range of the content, it may forward the BA interest packet to the upstream router using the packet transmitter 416 or the like; if the packet processing determination unit 701 determines that the interest packet is a BA interest packet and if the optimum content request processor 702 determines that the bit rate of the content in stored in the CS 704 is equal to or higher than the bit rate of content acquirable from the upstream router, on the basis of the constraining conditions indicating the allowable bit rate range of the content, the optimum content request processor 702 may transmit a data packet containing the content stored in the CS 704 in response using the packet transmitter 416 or the like.

Next, PIT information stored in the PIT 411 shown in FIG. 7 will be described in detail. FIG. 8 is a diagram showing an example of the data structure of the PIT information stored in the PIT 411 shown in FIG. 7. The PIT information 800 shown in FIG. 8 is PIT information improved to deliver content at an optimum bit rate.

Specifically, in the PIT information 800, one interest packet consists of six attributes: a content name that is indicated in a "name" field 801 and identifies content; receiving-interface information that is indicated in an "in face" field 802 and identifies a receiving face that has received the interest packet; transmitting-interface information that is indicated in an "out face" field 803 and identifies a transmitting face that has transmitted the interest packet; information which is indicated in a "BA req" field 804 and indicates whether the interest packet is a BA request-related packet; constraining conditions (reception-time constraining information) that are indicated in a "condition recv." field 805 and written if the interest packet is a BA request-related packet and when the router 410 receives the BA interest packet; and constraining conditions (transmission-time constraining information) that are indicated in a "condition sent" field 806 and written when the router 410 transmits the BA interest packet. The content name, receiving-interface information, and transmitting-interface information are also present in a typical PIT.

For example, assume that a typical interest packet about content having a content name "a" is received from a receiving face "eth1" and transmitted from a transmitting face "eth0." In this case, an entry "a" is stored in the "name" field 801 of the PIT 411, an entry "eth1" is stored in the "in face" field 802 thereof, an entry "eth0" is stored in the "out face" field 803 thereof, an entry "No" is stored in the "BA req" field 804 thereof, an entry " . . . (none)" is stored in the "condition recv." field 805 thereof, and an entry " . . . (none)" is stored in the "condition sent" field 806 thereof, as shown in the fourth row from below in FIG. 8.

Also, assume that a BA interest packet about content having a content name "a" is received from a receiving face "eth1," the reception-time constraining conditions are "min 1M, max 10M," the constraining conditions are changed to "min 1M, max 5M" on the basis of a determination made by the optimum content request processor 702 of the router 410, and the resulting the BA interest packet is transmitted from the transmitting face "eth0." In this case, an entry "a" is stored in the "name" field 801 of the PIT 411, an entry "eth1" in the "in face" field 802 thereof, an entry "eth0" in the "out face" field 803 thereof, an entry "Yes" in the "BA req" field 804 thereof, an entry "min 1M, max 10M" in the "condition recv." field 805 thereof, and an entry "min 1M, max 5M" in the "condition sent" field 806 thereof, as shown in the third row from below in FIG. 8.

Also assume that a BA interest packet about content having a content name "a" is received from a receiving face "eth2," the reception-time constraining conditions are "min 500 k, max 10M," the constraining conditions are changed to "min 1M, max 5M" on the basis of a determination made by the optimum content request processor 702 of the router 410, and the resulting BA interest packet is transmitted from the transmitting face "eth0." In this case, an entry "a" is stored in the "name" field 801 of the PIT 411, an entry "eth2" in the "in face" field 802 thereof, an entry "eth0" in the "out face" field 803 thereof, an entry "Yes" in the "BA req" field 804 thereof, an entry "min 500 k max 10M" in the "condition recv." field 805 thereof, and an entry "min 1M max 5M" in the "condition sent" field 806 thereof, as shown in the second row from below in FIG. 8.

Also, assume that a BA interest packet about other content having a content name "b" is received from the receiving face "eth1," the reception-time constraining conditions are "min 500 k, max 10M," the constraining conditions are changed to "min 3M, max 5M" on the basis of a determination made by the optimum content request processor 702 of the router 410, and the resulting BA interest packet is transmitted from the transmitting face "eth0." In this case, an entry "b" is stored in the "name" field 801 of the PIT 411, an entry "eth1" in the "in face" field 802 thereof, an entry "eth0" in the "out face" field 803 thereof, an entry "Yes" in the "BA req" field 804 thereof, an entry "min 500 k max 10M" in the "condition recv." field 805 thereof, and an entry "min 3M max 5M" in the "condition sent" field 806 thereof, as shown in the first row from below in FIG. 8.

As seen above, the optimum content request processor 702 generates transmission-time constraining information on the basis of the bit rate of the content stored in the CS 704, the reception-time constraining information, and the communication bandwidth between the router 410 and the upstream router.

Figure 9:
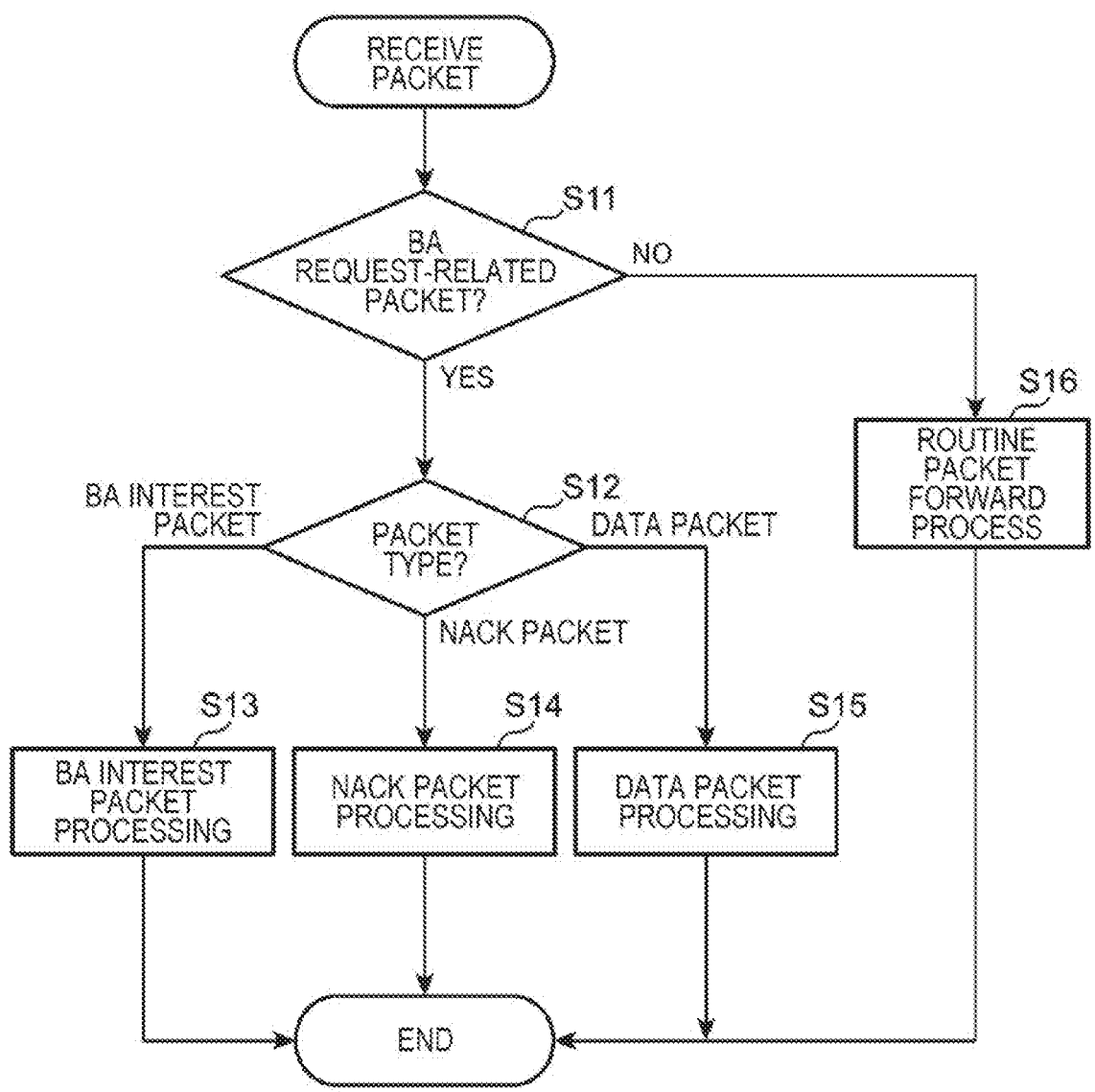
FIG. 9 is a flowchart showing an example of a process performed by a packet processing determination unit when the router shown in FIG. 7 receives a packet.

Next, an example of an operation performed by the router 410 that has received a packet in a communication control system of the present embodiment will be described in detail with reference to FIGS. 9 to 12. FIG. 9 is a flowchart showing an example of a process performed by the packet processing determination unit 701 when the router 410 shown in FIG. 7 receives a packet.

The process shown in FIG. 9 is started when the router 410 receives a packet through the packet receiver 414 or the like. Then, the packet processing determination unit 701 determines whether the received packet is a BA request-related packet (step S11). This determination is made using information in the packet type field 501, type field 510, or the like in the packet shown in FIG. 5.

If the received packet is not a BA request-related packet (NO in step S11), the packet processor 417 routinely forwards the CCN packet as described in Alexander Afanasyev et al., "NFD Developer's Guide", [online], NDN, Technical Report NDN-0021, [retrieved on the Internet on Jul. 7, 2015; http://named-data.net/wp-content/uploads/2014/07/NFD-developer-guide.pdf] or the like (step S16) and then ends the process.

On the other hand, if the received packet is a BA request-related packet (YES in step S11), the packet processing determination unit 701 determines the type of the packet (step S12). If the packet processing determination unit 701 determines that the received packet is a BA interest packet, the optimum content packet processing determination unit 702 performs BA interest packet processing shown in FIG. 10 (step S13). If the packet processing determination unit 701 determines that the received packet is a NACK packet, the optimum content request processor 702 performs NACK packet processing shown in FIG. 11 (step S14). If the packet processing determination unit 701 determines that the received packet is a data packet, the optimum content request processor 702 performs data packet processing shown in FIG. 12 (step S15) and then ends the process.

Figure 10:
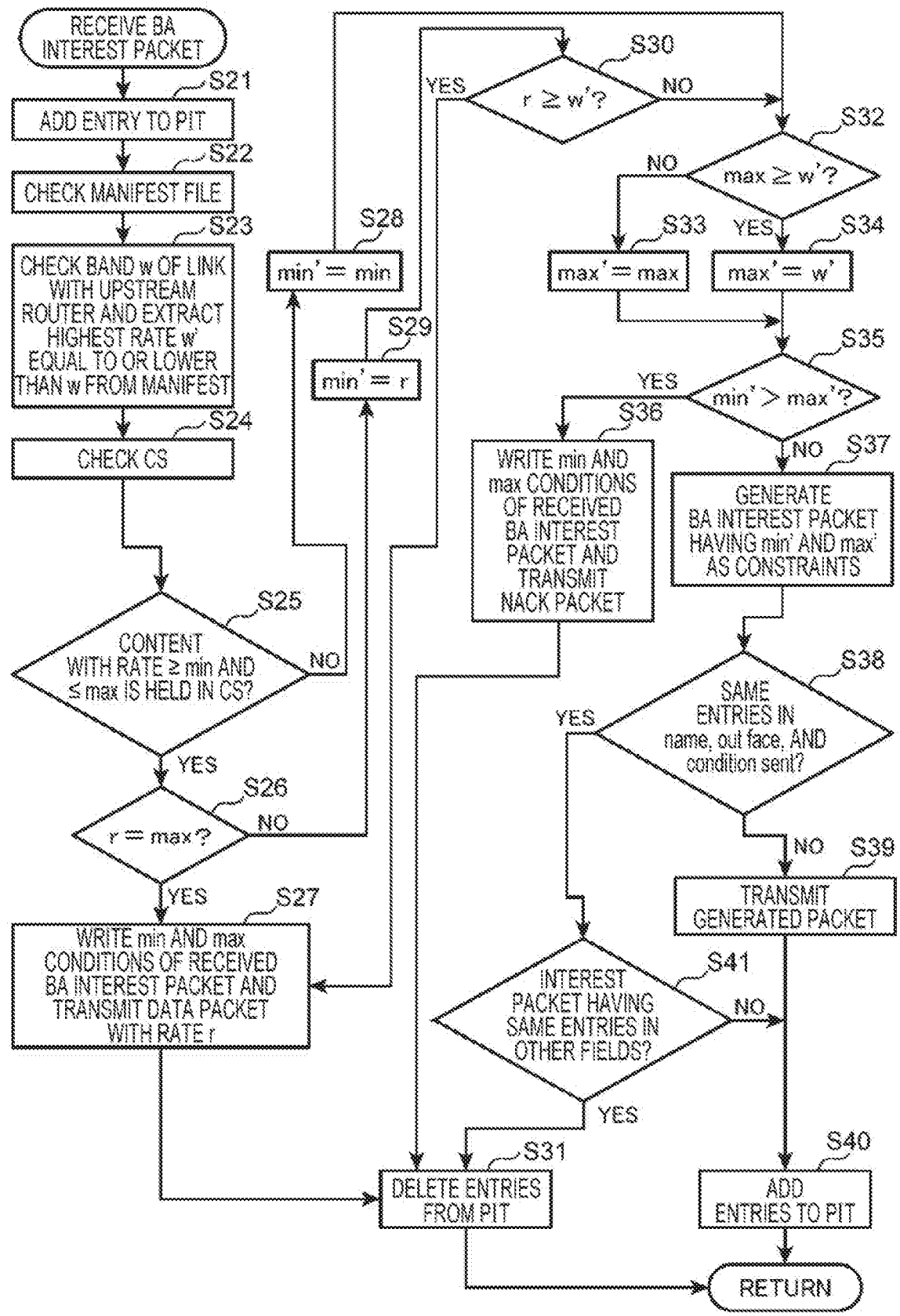
FIG. 10 is a flowchart showing an example of a process performed by an optimum content request processor when the router shown in FIG. 7 receives a BA interest packet.

FIG. 10 is a flowchart showing an example of a process performed by the optimum content request processor 702 when the router 410 shown in FIG. 7 receives a BA interest packet.

The process shown in FIG. 10 is started when it is determined in step S12 shown in FIG. 9 that the received packet is a BA interest packet. The optimum content request processor 702 of the router 410 adds information about the received BA interest packet to the PIT 411 as an entry (step S21). At this time, attributes of the BA interest packet are added to the "name" field 801, "in face" field 802, "BA req" field 804, and "condition recv." field 805 shown in FIG. 8 as information. Note that "min" and "max" described in the "condition recv." field 805 represent the minimum bit rate and maximum bit rate, respectively.

Next, the optimum content request processor 702 of the router 410 reads a manifest file associated with the received BA interest packet from the manifest information unit 703 and checks the manifest file (step S22).

The optimum content request processor 702 then acquires the bandwidth w of the link between the router 410 and an upstream router from the link bandwidth information manager 415 and checks it, compares the bandwidth w with the read manifest file, extracts the highest of the lower bit rates than the bandwidth w and written in the manifest file, and defines the highest bit rate as w' (step S23). If there is no bit rate that satisfies the above conditions, the optimum content request processor 702 sets w' to 0.

The optimum content request processor 702 then checks content in the CS 704 (step S24) and determines whether pieces of content held in the CS 704 and having a name required by the BA interest packet include content having a bit rate equal to or higher than min and equal to or lower than max (step S25). Note that the minimum bit rate and maximum bit rate that the router 410 adds to the BA interest packet as constraining conditions when forwarding the BA interest packet are referred to as min' and max', respectively.

If content satisfying the above conditions is not held in the CS 704 (NO in step S25), the optimum content request processor 702 makes min' equal to min (step S28) and then proceeds to step S32.

On the other hand, if content satisfying the above conditions is held in the CS 704 (YES in step S25), the optimum content request processor 702 defines a set of pieces of contents satisfying the above conditions as c, defines the highest of the bit rates of the pieces of content in the set c as r, and determines whether r matches max (step S26).

If r matches max (YES in step S26), the optimum content request processor 702 transmits content having the bit rate r held in the CS 704 through the packet transmitter 416 or the like in the form of a data packet in response (step S27). At this time, the optimum content request processor 702 writes the conditions min and max of the received BA interest packet into a field of the data packet (step S27). Thus, when a downstream router receives the data packet, it can determine in response to which BA interest packet the data packet has been transmitted. After transmitting the data packet, the optimum content request processor 702 deletes the entries of the BA interest packet from the PIT 411 (step S31) and ends the process shown in FIG. 10.

On the other hand, if r does not match max (NO in step S26), the optimum content request processor 702 sets min' to r (step 329) and proceeds to step S30.

Then, the optimum content request processor 702 determines whether r is equal to or higher than w' (step S30). If r is equal to or higher than w' (YES in step S30), content having a higher bit rate than the bit rate of content held in the CS 704 cannot be acquired from the upstream router. For this reason, the optimum content request processor 702 proceeds to step S27 and performs step S27. On the other hand, if w' is higher than r (NO in step S30), the optimum content request processor 702 may be able to receive content having a higher bit rate from the upstream router. For this reason, the optimum content request processor 702 proceeds to step S32.

The optimum content request processor 702 determines whether max is equal to or higher than w' (step S32). If max is lower than w' (NO in step S32), the optimum content request processor 702 sets max' to the same bit rate as max (step S33). On the other hand, if max is equal to or higher than w' (YES in step S32), the optimum content request processor 702 sets max' to the same bit rate as w' (step S34).

Then, the optimum content request processor 702 determines whether min' is higher than max' (step S35). If min' is higher than max' (YES in step S35), the optimum content request processor 702 cannot acquire content having a bit rate equal to or higher than min from the CS 704 of the router 410 or from the upstream router. For this reason, the optimum content request processor 702 transmits a NACK packet through the packet transmitter 416 or the like in response (step S36). At this time, as in step S27, the optimum content request processor 702 writes the conditions min and max of the received BA interest packet into the NACK packet and then transmits it. The optimum content request processor 702 then deletes the entries of the BA interest packet from the PIT 411 (step S31) and ends the process shown in FIG. 10.

On the other hand, if min' is equal to or lower than max' (NO in step S35), the optimum content request processor 702 generates a BA interest packet to be forwarded to the upstream router (step S37). In generating this BA interest packet, the optimum content request processor 702 writes the bit rates min' and max' as the conditions min and max as constraining conditions into the BA interest packet (step S37).

The optimum content request processor 702 then checks whether the interest packets in the PIT 411 include an interest packet whose entries in the "name" field 801, "out face" field 803, and "condition sent" field 806 all match the corresponding elements of the BA interest packet generated in step S37 (step S38).

If such an interest packet is included (YES in step S38), the optimum content request processor 702 does not transmit the generated BA interest packet, since the BA interest packet would be transmitted in an overlapped manner. It then determines whether the interest packets in the PIT 411 include an interest packet whose entries in fields other than the fields compared in step 38 all match the corresponding elements of the BA interest packet generated in step S37 (step S41).

If such an interest packet is included (YES in step S41), the optimum content request processor 702 deletes the entries of that interest packet from the PIT 411 (step S31) and ends the process shown in FIG. 10.

On the other hand, if such an interest packet is not included (NO in step S41), the optimum content request processor 702 adds entries about a face which is to transmit the generated BA interest packet to the "out face" field 803 and "condition sent" field 806 of the PIT 411 (step S40) and ends the process shown in FIG. 10.

If the interest packets in the PIT 411 do not include an interest packet whose entries in the "name" field 801, "out face" field 803, and "condition sent" field 806 all match the corresponding elements of the BA interest packet generated in step S37 (NO in step S38), the optimum content request processor 702 forwards the generated BA interest packet through the packet transmitter 416 or the like (step 339), adds entries about the forwarded BA interest packet to the PIT 411 (step S40), and ends the process shown in FIG. 10.

Figure 11:
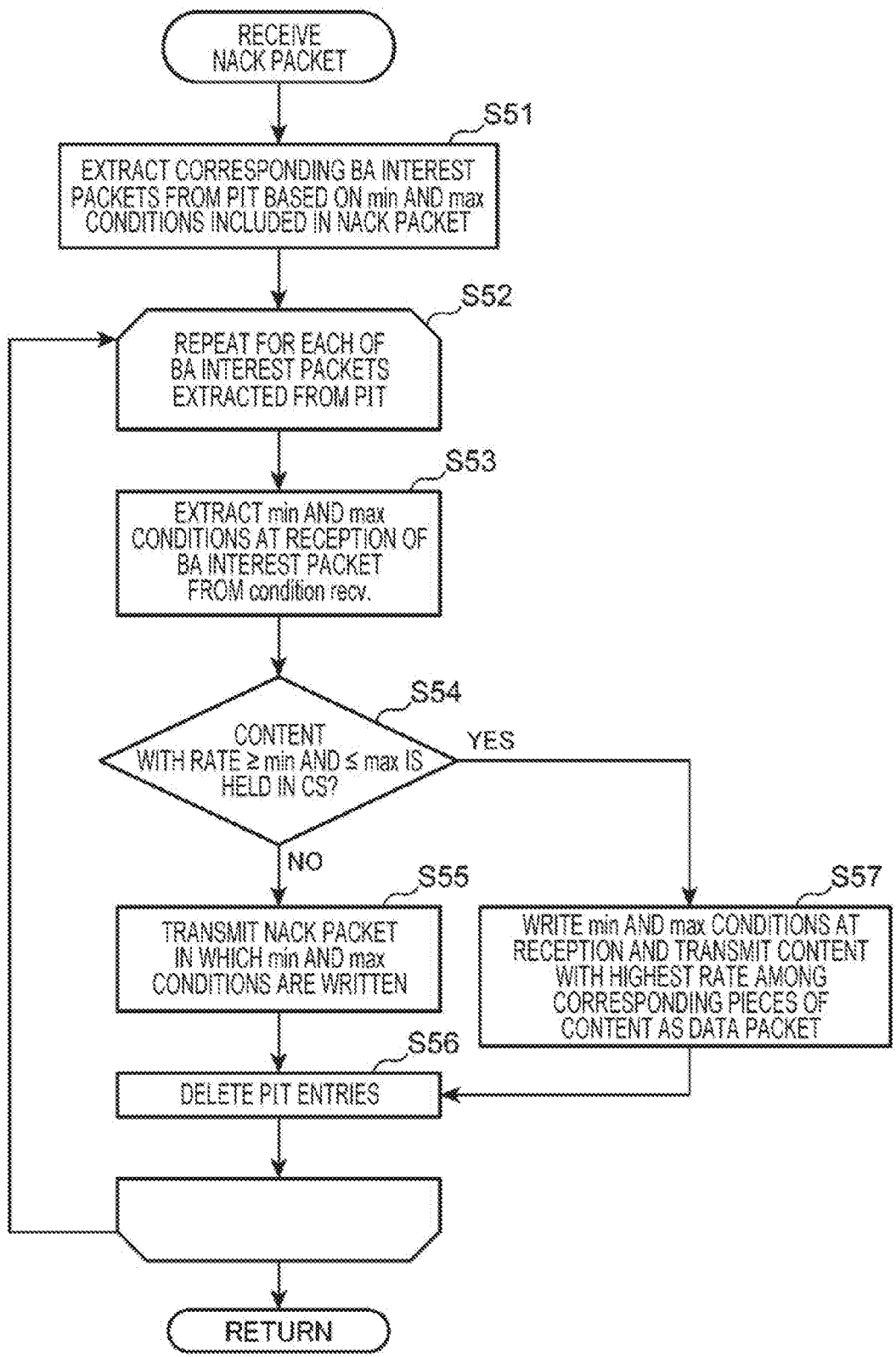
FIG. 11 is a flowchart showing an example of a process performed by the optimum content request processor when the router shown in FIG. 7 receives a BA request-related NACK packet.

FIG. 11 is a flowchart showing an example of a process performed by the optimum content request processor 702 when the router 410 shown in FIG. 7 receives a BA request-related NACK packet.

The process shown in FIG. 11 is started when it is determined in step S12 shown in FIG. 9 that the received packet is a BA request-related NACK packet. As described with reference to FIG. 10, a NACK packet contains the conditions min and max of a corresponding BA interest packet so that it is recognized in response to which BA interest packet the NACK packet has been transmitted. That is, the router that has transmitted the BA interest packet can extract BA interest packets in the PIT 411 corresponding to the NACK packet by using the entries in the "name" field 801, "out face" field 803, and "condition sent" field 806 in the PIT information 800 shown in FIG. 8.

In the process shown in FIG. 11, first, the optimum content request processor 702 extracts BA interest packets in the PIT 411 corresponding to the received NACK packet using the above method (step S51). Then, in loop S52, steps S53 to S57 are repeatedly performed on each of the BA interest packets extracted from the PIT 411 in step S51.

Specifically, with respect to one of the BA interest packets extracted from the PIT 411, the optimum content request processor 702 extracts the conditions min and max of the BA interest packet at the reception from the "condition recv." field 805 (step S53). Again, "min" and "max" written in the "condition recv." field 805 represent the minimum bit rate and maximum bit rate, respectively.

The optimum content request processor 702 then determines whether the CS 704 of the router 410 is holding content having a bit rate equal to or higher than min and equal to or lower than max (step S54).

If the CS 704 is not holding such content (NO in step S54), the optimum content request processor 702 generates a NACK packet in which the min and max bit rates are written as the conditions min and max, transmits it to a face described in the "in face" field 802 in response (step S55), and then deletes the BA interest packet from the PIT 411 (step S56).

On the other hand, if the CS 704 is holding such content (YES in step S54), the optimum content request processor 702 transmits content having the highest bit rate among corresponding pieces of content to a face described in the "in face" field 802 in the form of a data packet in response (step S57). At this time, the optimum content request processor 702 writes the min and max bit rates at the reception into the data packet as the conditions min and max (step S57) and then deletes this BA interest packet from the PIT 411 (step S56). After processing all the extracted BA interest packets, the optimum content request processor 702 exits loop S52 and ends the process shown in FIG. 11.

Figure 12:
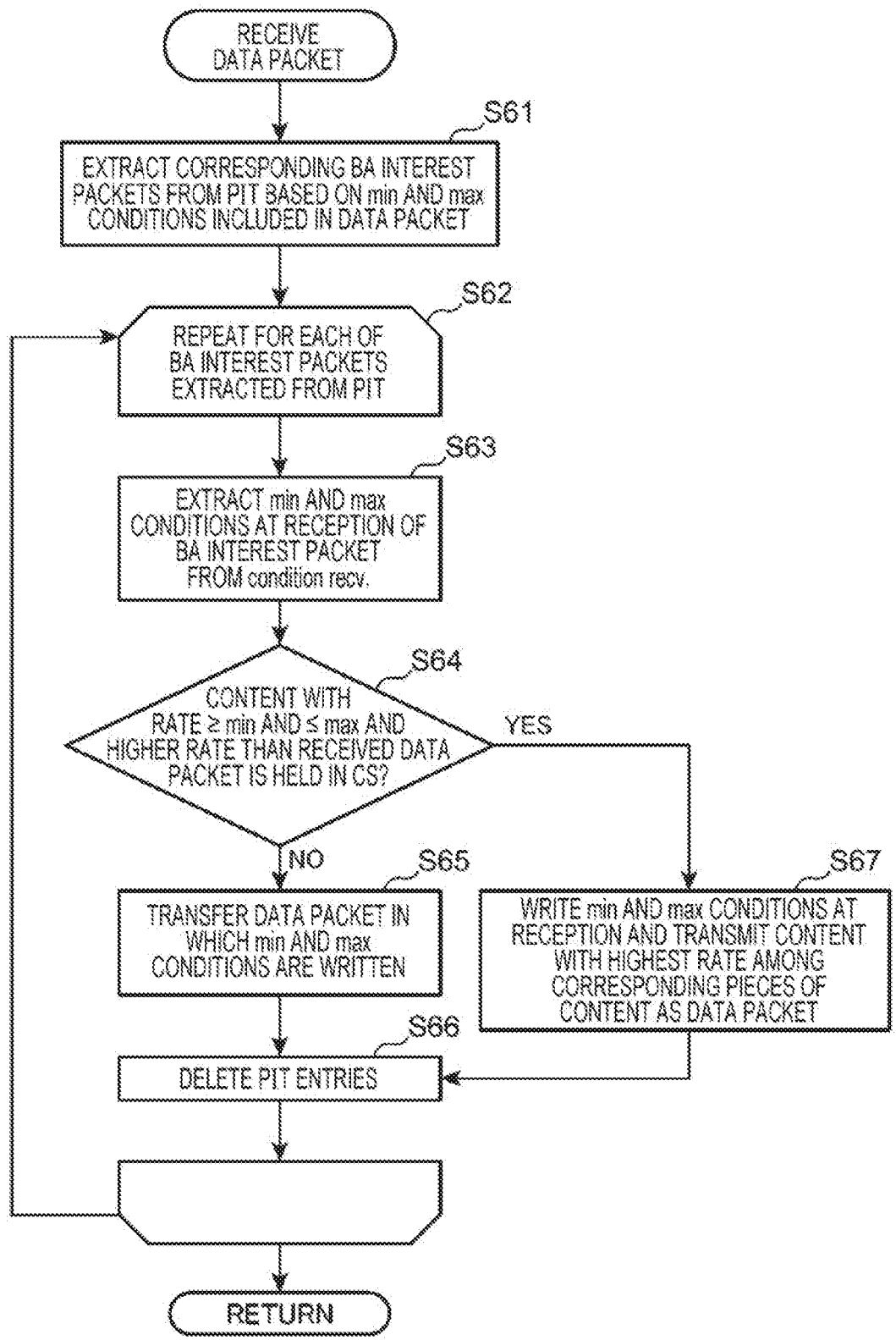
FIG. 12 is a flowchart showing an example of a process performed by the optimum content request processor when the router shown in FIG. 7 receives a BA request-related data packet.

FIG. 12 is a flowchart showing an example of a process performed by the optimum content request processor 702 when the router 410 shown in FIG. 7 receives a BA request-related data packet.

The process shown in FIG. 12 is started when it is determined in step S12 shown in FIG. 9 that the received packet is a BA request-related data packet. As described with reference to FIG. 10, a data packet contains the conditions min and max described in a corresponding BA interest packet so that it is recognized in response to which BA interest packet the data packet has been transmitted. That is, the router that has transmitted the BA interest packet can extract BA interest packets in the PIT 411 corresponding to the data packet by using the entries in the "name" field 801, "out face" field 803, and "condition sent" field 806 in the PIT information 800 shown in FIG. 8.

In the process shown in FIG. 12, first, the optimum content request processor 702 extracts BA interest packets in the PIT corresponding to the received data packet using the above method (step S61). Then, in loop S62, steps S63 to S67 are performed on each of the BA interest packets extracted from the PIT 411 in step S61.

Specifically, with respect to one of the BA interest packets extracted from the PIT 411, the optimum content request processor 702 extracts the conditions min and max of the BA interest packet at the reception from the "condition recv." field 805 (step S63). Again, "min" and "max" written in the "condition recv." field 805 represent the minimum bit rate and maximum bit rate, respectively.

The optimum content request processor 702 then determines whether the CS 704 of the router 410 is holding content having a bit rate which is equal to or higher than min and equal to or lower than max and which is higher than the bit rate in the received data packet (step S64).

If the CS 704 is not holding such content (NO in step S64), the optimum content request processor 702 forwards the received data packet (step S65). At this time, the optimum content request processor 702 writes the min and max bit rates into the data packet to be forwarded as the conditions min and max (step S65), transmits the resulting data packet to a face described in the "in face" field 802 in response (step S65), and then deletes this BA interest packet from the PIT 411 (step S66).

On the other hand, if the CS 704 is holding such content (YES in step S64), the optimum content request processor 702 transmits content having the highest bit rate among corresponding pieces of content to the face described in the "in face" field 802 in the form of a data packet in response (step S67). At this time, the optimum content request processor 702 writes the min and max bit rates at the reception into the data packet as the conditions min and max (step S67) and then deletes this BA interest packet from the PIT 411 (step S66). After processing all the extracted BA interest packets, the optimum content request processor 702 exits loop S62 and ends the process shown in FIG. 12.

In the processes of the present embodiment described above, a comparison is made among the bit rate of the content stored in the CS 704, the constraining conditions indicating the allowable bit rate range of the content, the communication bandwidth between the router 410 and upstream router, and the manifest information stored in the manifest information unit 703 and, if it is determined that content having a higher bit rate than the bit rate of the content stored in the CS 704 can be acquired from the forward destination router, the BA interest packet is forwarded to the forward destination router. Thus, the content having the higher bit rate can be acquired from the forward destination router.

Also, a comparison is made among the bit rate of the content stored in the CS 704, the constraining conditions indicating the allowable bit rate range of the content, the communication bandwidth between the router 410 and upstream router, and the manifest information stored in the manifest information unit 703 and, if it is determined that the bit rate of the content stored in the CS 704 is equal to or higher than the bit rate of content acquirable from the forward destination router, a data packet containing the content stored in the CS 704 is transmitted in response. Thus, content having the highest bit rate acquirable by the client 400 can be transmitted in the form of a data packet in response without forwarding an unnecessary BA interest packet.

By processing a packet using information about the communication bandwidth of content-centric networking and information about content cached in the routers as described above, it is possible to deliver content having the highest quality acquirable by the client 400 can and to improve the delivery quality of content.

If one router receives a BA interest packet and contains content which is written in a manifest file but has lower bit rates than the condition min, it is conceivable that content having such bit rates is cached in the CS 704 of a downstream router. For this reason, even if a NACK packet is transmitted in response to the BA interest packet, it is conceivable that the client 400 can acquire the content cached in the downstream router.

However, if the size of the CS 704 of the downstream router holding the cache of the content is very small, the cached data may be deleted in the period from when the router forwards the BA interest packet to when the it receives a NACK packet corresponding to the BA interest packet.

In this case, the optimum content request processor 702 may address the cache-out of the data in the CS 704 as follows: when transmitting the BA interest packet, it sets predetermined content (e.g., content having a bit rate which is described in a manifest file and is lower than the condition min) in the CS 704 to an undeletable state and keeps the predetermined content undeletable until it receives a packet (e.g., a data packet, control packet, NACK packet) corresponding to the BA interest packet.

Specifically, the optimum content request processor 702 may add cache-unclearable information indicating that the cache is unclearable (e.g., a cache-unclearable flag) to the PIT information 800 shown in FIG. 8 as an element stored in the PIT 411. Also, the optimum content request processor 702 may write a cache-unclearable flag of content having a bit rate r into the PIT 411 in step S29 of FIG. 10 and may refer to the cache-unclearable flag in the PIT 411 when the cache of the CS 704 of the router 410 is cleared. The optimum content request processor 702 may cancel the cache-unclearable flag when deleting the entry in the PIT 411.

The use of the above method can prevent a situation in which content cached in the CS 704 of the router 410 is cleared and thus is no longer delivered.

The present disclosure can be used as a communication controller in content-centric networking, particularly as a router that relays data (relay device), a client that receives data (terminal device), and a publisher that provides data (content provider), or the like.

What is claimed is:

1. A communication controller connected to content-centric networking, comprising:
   a data storage that stores content;
   a determiner that determines whether a received interest packet is a constrained interest packet including a content name for identifying content and quality constraining information that defines an allowable quality range of the content;
   a request processor that
      when the determiner determines that the interest packet is the constrained interest packet and when the request processor determines that content having higher quality than quality of the content stored in the data storage can be acquired from a forward destination communication controller, on the basis of the quality of the content stored in the data storage and the quality constraining information, forwards the constrained interest packet to the forward destination communication controller, and
      when the determiner determines that the interest packet is the constrained interest packet and when the request processor determines that the quality of the content stored in the data storage is equal to or higher than quality of content acquirable from the forward destination communication controller, on the basis of the quality of the content stored in the data storage and the quality constraining information, transmits a data packet containing the content stored in the data storage in response,
   wherein the quality of the content includes a bit rate of the content, and the quality constraining information in the constrained interest packet includes a predetermined allowable bit rate range of the content, including a maximum allowable bit rate and a minimum allowable bit rate; and
   a bandwidth information manager that acquires a communication bandwidth between the communication controller and the forward destination communication controller,
      wherein when the request processor determines that content having higher quality than the quality of the content stored in the data storage can be acquired from the forward destination communication controller, on the basis of a bit rate of the content stored in the data storage, the bit rate constraining information, and the communication bandwidth, the request processor forwards the constrained interest packet to the forward destination communication controller, and
      wherein when the request processor determines that the bit rate of the content stored in the data storage is equal to or higher than a bit rate of content acquirable from the forward destination communication controller, on the basis of the bit rate of the content stored in the data storage, the bit rate constraining information, and the communication bandwidth, the request processor transmits a data packet containing the content stored in the data storage in response.

2. The communication controller of claim 1,
   wherein the data packet includes the bit rate constraining information,
   wherein when the request processor receives the data packet, the request processor extracts the bit rate constraining information from the data packet, and
   wherein when the request processor determines that the bit rate of the content stored in the data storage falls within an allowable bit rate range defined in the bit rate constraining information and is higher than a bit rate of the data packet, the request processor transmits a data packet containing content having the highest bit rate among pieces of content stored in the data storage in response.

3. The communication controller of claim 1,
   wherein when the request processor determines that a bit rate of content acquirable from a transmission source communication controller that has transmitted the constrained interest packet is higher than the bit rate of the content acquirable from the forward destination communication controller and the bit rate of the content stored in the data storage or determines that the bit rate of the content acquirable from the forward destination communication controller or the bit rate of the content stored in the data storage does not fall within the allowable bit rate range defined in the bit rate constraining information, on the basis of the bit rate of the content stored in the data storage unit, the bit rate constraining information, and the communication bandwidth, the request processor transmits a negative acknowledgement packet indicating that content cannot be acquired in response.

4. The communication controller of claim 3,
wherein the negative acknowledgement packet includes the bit rate constraining information,
wherein when the request processor receives the negative acknowledgement packet, the request processor extracts the bit rate constraining information from the negative acknowledgement packet, and
wherein when the request processor determines that the bit rate of the content stored in the data storage falls within the allowable bit rate range defined in the bit rate constraining information, the request processor transmits a data packet containing content having the highest bit rate among pieces of content stored in the data storage in response.

5. The communication controller of claim 1,
wherein the bit rate constraining information includes reception-time constraining information at reception of the constrained interest packet and transmission-time constraining information at transmission of the constrained interest packet, and
wherein the request processor generates the transmission-time constraining information on the basis of the bit rate of the content stored in the data storage, the reception-time constraining information, and the communication bandwidth.

6. The communication controller of claim 1, further comprising:
a bit rate storage that stores bit rate information transmitted from a content provider and includes the content name and a bit rate at which the content identified by the content name can be acquired,
wherein the request processor determines which of a process of forwarding the constrained interest packet to the forward destination communication controller, a process of transmitting a data packet containing the content stored in the data storage in response, and a process of transmitting a negative acknowledgement packet indicating that content cannot be acquired in response should be performed, on the basis of the bit rate of the content stored in the data storage, the bit rate constraining information, the communication bandwidth, and the bit rate information.

7. The communication controller of claim 1,
wherein the request processor sets predetermined content in the data storage to an undeletable state when transmitting the constrained interest packet and keeps the predetermined content undeletable until receiving a packet corresponding to the constrained interest packet.

8. The communication controller of claim 1,
wherein at least one of a header region and a message region of the interest packet contains identification information indicating that the interest packet is the constrained interest packet.

9. A communication control method performed by a communication controller, the communication controller being connected to content-centric networking and including a data storage that stores content, the method comprising:
determining whether a received interest packet is a constrained interest packet including a content name for identifying content and quality constraining information that defines an allowable quality range of the content;
when it is determined that the interest packet is the constrained interest packet and when it is determined that content having higher quality than quality of the content stored in the data storage can be acquired from a forward destination communication controller, on the basis of quality of the content stored in the data storage and the quality constraining information, forwarding the constrained interest packet to the forward destination communication controller; and
when it is determined that the interest packet is the constrained interest packet and if it is determined that the quality of the content stored in the data storage is equal to or higher than quality of content acquirable from the forward destination communication controller, on the basis of the quality of the content stored in the data storage and the quality constraining information, transmitting a data packet containing the content stored in the data storage in response,
wherein the quality of the content includes a bit rate of the content, and the quality constraining information in the constrained interest packet includes a predetermined allowable bit rate range of the content, including a maximum allowable bit rate and a minimum allowable bit rate; and
acquiring, by a bandwidth information manager, a communication bandwidth between the communication controller and the forward destination communication controller,
wherein when a request processor determines that content having higher quality than the quality of the content stored in the data storage can be acquired from the forward destination communication controller, on the basis of a bit rate of the content stored in the data storage, the bit rate constraining information, and the communication bandwidth, the request processor forwards the constrained interest packet to the forward destination communication controller, and
wherein when the request processor determines that the bit rate of the content stored in the data storage is equal to or higher than a bit rate of content acquirable from the forward destination communication controller, on the basis of the bit rate of the content stored in the data storage, the bit rate constraining information, and the communication bandwidth, the request processor transmits a data packet containing the content stored in the data storage in response.

10. A communication control system that delivers content through content-centric networking, comprising:
a content provider that provides the content;
a terminal device that acquires the content; and
a relay device connected to the content provider and the terminal device through the content-centric networking, wherein the relay device includes
a data storage that stores the content;
a determiner that determines whether a received interest packet is a constrained interest packet including a content name for identifying content and quality constraining information that defines an allowable quality range of the content; and
a request processor that
when the determiner determines that the interest packet is the constrained interest packet and when the request processor determines that content having higher quality than quality of the content stored in the data storage can be acquired from a forward destination communication controller, on the basis of the quality of the content stored in the data storage and the quality constraining information, forwards the constrained interest packet to the forward destination communication controller, and
when the determiner determines that the interest packet is the constrained interest packet and when the request processor determines that the quality of the content stored in the data storage is equal to or higher than quality of content acquirable from the forward destination communication controller, on the basis of the quality of the content stored in the data storage and the quality constraining information, transmits a data packet containing the content stored in the data storage in response,
wherein the quality of the content includes a bit rate of the content, and the quality constraining information in the constrained interest packet includes a predetermined allowable bit rate range of the content, including a maximum allowable bit rate and a minimum allowable bit rate; and
a bandwidth information manager that acquires a communication bandwidth between the communication controller and the forward destination communication controller,
wherein when the request processor determines that content having higher quality than the quality of the content stored in the data storage can be acquired from the forward destination communication controller, on the basis of a bit rate of the content stored in the data storage, the bit rate constraining information, and the communication bandwidth, the request processor forwards the constrained interest packet to the forward destination communication controller, and
wherein when the request processor determines that the bit rate of the content stored in the data storage is equal to or higher than a bit rate of content acquirable from the forward destination communication controller, on the basis of the bit rate of the content stored in the data storage, the bit rate constraining information, and the communication bandwidth, the request processor transmits a data packet containing the content stored in the data storage in response.

11. A communication node, comprising:
storage; and
processing circuitry that, in operation, performs operations including
receiving a manifest file from a publisher, the manifest file including a content name of content provided by the publisher and a plurality of available rates for the content;
receiving an interest packet from a first communication node, the interest packet including a content name identifying request content, constraining conditions that define a lower limit rate and an upper limit rate that the request content is required to satisfy, the lower limit rate and the upper limit rate being selected from the plurality of available rates;
acquiring a rate of communication between the first communication node and a second communication node;
when the storage stores one or more pieces of content that satisfy the constraining conditions, determining whether a rate of first content having the highest quality among the one or more pieces of content matches the upper limit rate; and
when (i) it is determined that the rate of the first content having the highest quality matches the upper limit rate or when (ii) it is determined that the rate of the first content having the highest quality does not match the upper limit rate and the rate of the first content is equal to or higher than the rate of the communication between the first communication node and the second communication node, transmitting a first data packet containing the first content to the first node in response,
wherein the quality of the content includes a bit rate of the content, and the quality constraining information in the constrained interest packet includes a predetermined allowable bit rate range of the content, including a maximum allowable bit rate and a minimum allowable bit rate; and
acquiring a communication bandwidth between the first communication node and the second communication node,
wherein when the processing circuitry determines that content having higher quality than the quality of the content stored in the storage can be acquired from the second communication node, on the basis of a bit rate of the content stored in the storage, the bit rate constraining information, and the communication bandwidth, the processing circuitry forwards the constrained interest packet to the second communication node, and
wherein when the processing circuitry determines that the bit rate of the content stored in the storage is equal to or higher than a bit rate of content acquirable from the second communication node, on the basis of the bit rate of the content stored in the storage, the bit rate constraining information, and the communication bandwidth, the processing circuitry transmits a data packet containing the content stored in the storage in response.

* * * * *